US011129083B2

(12) United States Patent
Akahira et al.

(10) Patent No.: US 11,129,083 B2
(45) Date of Patent: Sep. 21, 2021

(54) RADIO NODE, RADIO COMMUNICATION SYSTEM, COMMUNICATION CONTROL METHOD, AND PROGRAM

(71) Applicant: NEC Platforms, Ltd., Kawasaki (JP)

(72) Inventors: Takefumi Akahira, Kanagawa (JP); Atsuo Okuya, Kanagawa (JP); Yoshihiro Sasaki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/765,351

(22) PCT Filed: Jun. 26, 2018

(86) PCT No.: PCT/JP2018/024247
§ 371 (c)(1),
(2) Date: May 19, 2020

(87) PCT Pub. No.: WO2019/097754
PCT Pub. Date: May 23, 2019

(65) Prior Publication Data
US 2020/0359298 A1    Nov. 12, 2020

(30) Foreign Application Priority Data
Nov. 20, 2017  (JP) .............................. JP2017-222660

(51) Int. Cl.
*H04W 40/24* (2009.01)
*H04W 52/02* (2009.01)
*H04W 84/12* (2009.01)

(52) U.S. Cl.
CPC ..... *H04W 40/248* (2013.01); *H04W 52/0203* (2013.01); *H04W 84/12* (2013.01)

(58) Field of Classification Search
CPC .......... H04W 40/248; H04W 52/0203; H04W 84/12; H04W 52/0206; H04W 40/24;
(Continued)

(56) References Cited

FOREIGN PATENT DOCUMENTS

| JP | 2005-184285 A | 7/2005 |
|----|---------------|--------|
| JP | 2015-186010 A | 10/2015 |

(Continued)

OTHER PUBLICATIONS

Sho Fujita et al., "An Extension of Active Access Point Selection Algorithm Considering Practical Conditions for Wireless Mesh Networks", The Institute of Electronics, Information and Communication Engineers technical report, Feb. 27, 2014, pp. 35-40, vol. 113, No. 465.

(Continued)

*Primary Examiner* — Jung Liu
(74) *Attorney, Agent, or Firm* — Sughrue Mion, PLLC

(57) ABSTRACT

A radio node achieving power saving in a radio communication system is provided. A radio node (10) includes: a first communication unit (11) configured to connect to at least one communication apparatus (20) allowed to be connected to a network and another radio node (21); a determination unit (12) configured to determine, in a situation in which each of all the communication apparatuses (20) is connected to one of the radio nodes (10) and (21) included in the network, whether or not a communication apparatus (20) that transmits data via the first communication unit (11) is present; and a control unit (13) configured to stop the first communication unit (11) when it is determined that the communication apparatus (20) that transmits data via the first communication unit (11) is not present.

9 Claims, 15 Drawing Sheets

(58) Field of Classification Search
CPC .. H04W 84/047; Y02D 30/70; G06F 19/3418;
G06F 19/3456; G06F 19/322; G16H
10/60; H04L 45/02; H04L 45/18; H04L
45/66; H04L 45/38; H04L 45/16; H04L
45/50; H04L 49/254; H04L 45/42; H04L
45/48; H04L 47/125; H04L 45/54; H04L
45/745; H04L 49/101; H04L 12/4641
See application file for complete search history.

(56) References Cited

FOREIGN PATENT DOCUMENTS

| | | |
|---|---|---|
| JP | 2015-220681 A | 12/2015 |
| JP | 2016-046542 A | 4/2016 |

OTHER PUBLICATIONS

International Search Report for PCT/JP2018/024247 dated Aug. 7, 2018 (PCT/ISA/210).

COMMUNICATION APPARATUS TABLE T1

| MAC ADDRESS | COMMUNICATION PATH INFORMATION |
|---|---|
| aa:bb:cc:dd:ee:ff | 30_1 – 30_3 – 40 |
| | |
| | |

Fig. 5

RADIO NODE, RADIO COMMUNICATION SYSTEM, COMMUNICATION CONTROL METHOD, AND PROGRAM

CROSS REFERENCE TO RELATED APPLICATIONS

This application is a National Stage of International Application No. PCT/JP2018/024247 filed Jun. 26, 2018, claiming priority based on Japanese Patent Application No. 2017-222660, filed Nov. 20, 2017, the disclosures of which are incorporated herein in their entirety by reference.

TECHNICAL FIELD

The present disclosure relates to a radio node, a radio communication system, a communication control method, and a program.

BACKGROUND ART

In places where a radio communication environment is not provided, a communication environment such as a wireless Local Area Network (LAN) needs to be provided over a wide range of places. In these places, a plurality of radio communication apparatuses that have a relay function are installed, whereby a radio network is constructed. Specifically, for example, the radio network is constructed by connecting a plurality of radio communication apparatuses to a radio communication apparatus that is connected to another network such as the Internet by a wire.

In the aforementioned radio network, even when all the radio terminals that are wirelessly connected are identified, each of the radio communication apparatuses continues to output radio waves to be connected to the radio terminals regardless of whether or not all the radio terminals are wirelessly connected. Therefore, wasteful power is consumed in the entire radio communication system.

In order to solve the above problem, as disclosed in, for example, Patent Literature 1, a related technique for saving power in a radio network has been discussed. In the technique disclosed in Patent Literature 1, a radio base station performs inter-station communication with another radio base station when a radio terminal is connected to the radio base station, thereby constructing a communication path. When the radio terminal is not connected on the constructed communication path, the radio base station disconnects the inter-station communication with the other radio base station to save power in order to disconnect the communication path where the radio terminal is not connected.

CITATION LIST

Patent Literature

[Patent Literature 1] Japanese Unexamined Patent Application Publication No. 2016-046542

SUMMARY OF INVENTION

Technical Problem

While Patent Literature 1 discloses that the radio base station stops the inter-station communication unit to save power, Patent Literature 1 does not disclose power saving processing regarding a terminal communication unit that is connected to the radio terminal. Since the terminal communication unit periodically sends a beacon signal in order to search for the radio terminal, it is desired to save power of the terminal communication unit in order to save power in the radio base station. Therefore, in the radio communication system including the radio base station disclosed in Patent Literature 1, a sufficient amount of power is not saved in the entire radio communication system. Accordingly, it is desired to stop wasteful radio wave output in the radio communication system constructed by a plurality of radio communication apparatuses, thereby reducing wasteful power consumption.

The present disclosure has been made in order to solve the aforementioned problem and aims to provide a radio node, a communication control method, and a program for saving power in a radio communication system.

Solution to Problem

A radio node according to a first aspect includes: a first communication unit configured to connect to at least one communication apparatus allowed to be connected to a network and another radio node; a determination unit for determining, in a situation in which each of all the communication apparatuses is connected to one of the radio nodes included in the network, whether or not a communication apparatus that transmits data via the first communication unit is present; and a control unit for stopping the first communication unit when it is determined that a communication apparatus that transmits data via the first communication unit is not present.

A communication control method according to a second aspect includes: determining, in a situation in which each of all communication apparatuses that are allowed to be connected to a network is connected to one of radio nodes included in the network, whether or not a communication apparatus that transmits data via a communication unit that is connected to one of the communication apparatuses and another radio node is present; and stopping the communication unit when it is determined that a communication apparatus that transmits data via the communication unit is not present.

A program according to a third aspect is a program for causing a radio node to execute the following processing of: determining, in a situation in which each of all communication apparatuses that are allowed to be connected to a network is connected to one of radio nodes included in the network, whether or not a communication apparatus that transmits data via a communication unit that is connected to one of the communication apparatuses and another radio node is present; and stopping the communication unit when it is determined that a communication apparatus that transmits data via the communication unit is not present.

Advantageous Effects of Invention

According to the above aspects, it is possible to save power in a radio communication system.

BRIEF DESCRIPTION OF DRAWINGS

FIG. 5 is a diagram showing one example of a communication apparatus table;

DESCRIPTION OF EMBODIMENTS

Hereinafter, with reference to the drawings, example embodiments will be explained. Note that, in the example embodiments, the same elements are denoted by the same reference symbols and overlapping descriptions will be omitted.

Outline of Example Embodiments

Figure 1:
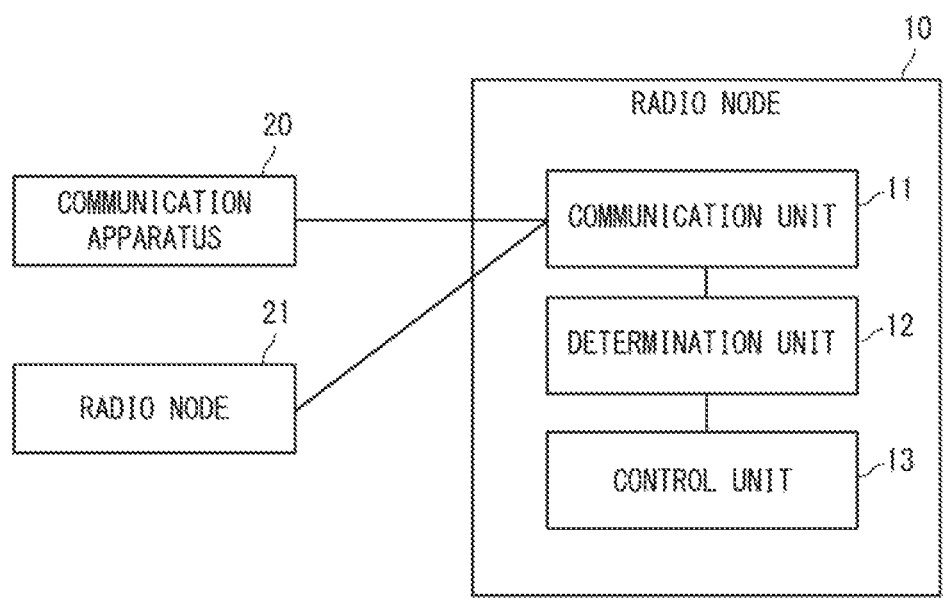
FIG. 1 is a configuration diagram showing a configuration example of radio nodes in the outline of example embodiments.

First, prior to giving the description of example embodiments, an outline of the example embodiments will be described. With reference to FIG. 1, a radio node 10 in the outline of the example embodiments will be described. FIG. 1 is a configuration diagram showing a configuration example of radio nodes in the outline of the example embodiments.

The radio node 10, which is a communication apparatus capable of performing radio communication, may be, for example, a mobile router, a wireless LAN access point, a repeater, a mobile telephone terminal, a smartphone terminal, a tablet terminal, a personal computer apparatus or the like.

The radio node 10 is connected to a communication apparatus 20 which is present in a communication area of the radio node 10. Alternatively, the radio node 10 is connected to a radio node 21 that is present in the communication area of the radio node 10. The radio node 21 may be connected to the communication apparatus 20. When the radio node 10 is connected to the communication apparatus 20 that is present in the communication area of the radio node 10, it can also be said that the radio node 10 is directly connected to the communication apparatus 20. When the radio node 21 is connected to the communication apparatus 20, it can be said that the radio node 10 is connected to the communication apparatus 20 via the radio node 21.

The communication apparatus 20 is a communication apparatus that is allowed to be connected to a network to which the radio node 10 belongs. The communication apparatus 20, which is a communication apparatus capable of performing radio communication, may be, for example, a mobile telephone terminal, a smartphone terminal, a tablet terminal, a personal computer apparatus or the like.

The radio node 21 is a radio node that is present in the communication area of the radio node 10. The radio node 21 is a radio node that is different from the radio node 10. The radio node 21 may be, for example, a mobile router, a wireless LAN access point, a repeater, a mobile telephone terminal, a smartphone terminal, a tablet terminal, a personal computer apparatus or the like. While only one communication apparatus 20 and only one radio node 21 are shown in FIG. 1, a plurality of communication apparatuses 20 and a plurality of radio nodes 21 may instead be provided.

The radio node 10 includes a communication unit 11, a determination unit 12, and a control unit 13. Each of the communication unit 11, the determination unit 12, and the control unit 13 may be software or a module whose processing is executed by a processor executing a program stored in a memory. Further, each of the communication unit 11, the determination unit 12, and the control unit 13 may be hardware such as a circuit or a chip.

The communication unit 11 is a communication unit that is connected to the communication apparatus 20 and the radio node 21. When the radio node 21 is connected to the communication apparatus 20, the communication unit 11 may be connected to the communication apparatus 20 via the radio node 21.

The determination unit 12 determines, in a situation in which each of all the communication apparatuses 20 is connected to one of radio nodes included in a network to which the radio node 10 belongs, whether there is a communication apparatus 20 that transmits data via the communication unit 11. The determination unit 12 may determine whether there is a communication apparatus 20 that transmits data via the communication unit 11 based on connection information of all the communication apparatuses 20.

The connection information may be communication path information of the communication apparatus 20. Alternatively, the connection information may be information indicating whether or not the communication apparatus 20 is connected to the radio node 10 directly or via the radio node 21. Alternatively, the connection information may indicate the number of communication apparatuses 20 connected to the radio node 10 directly or via the radio node 21.

When the determination unit 12 determines that there is no communication apparatus 20 that transmits data via the communication unit 11, the control unit 13 stops the communication unit 11. The control unit 13 may stop the communication unit 11 by stopping the power supply to the communication unit 11. Alternatively, the control unit 13 may instruct the communication unit 11 to stop the operation to stop the communication unit 11.

As described above, the determination unit 12 determines whether there is a communication apparatus 20 that transmits data via the communication unit 11. When the determination unit 12 determines that there is no communication apparatus 20 that transmits data via the communication unit 11, the control unit 13 stops the communication unit 11. Therefore, with the use of the radio node 10 in the example embodiments, when a communication apparatus 20 that transmits data via the communication unit 11 is not present, that is, when the communication unit 11 does not need to transmit radio waves, the communication unit 11 can be stopped. It is therefore possible to save power in the radio communication system that includes the radio node 10.

First Example Embodiment

Hereinafter, with reference to the drawings, example embodiments of the present disclosure will be described.

Configuration Example of Radio Communication System

Figure 2:
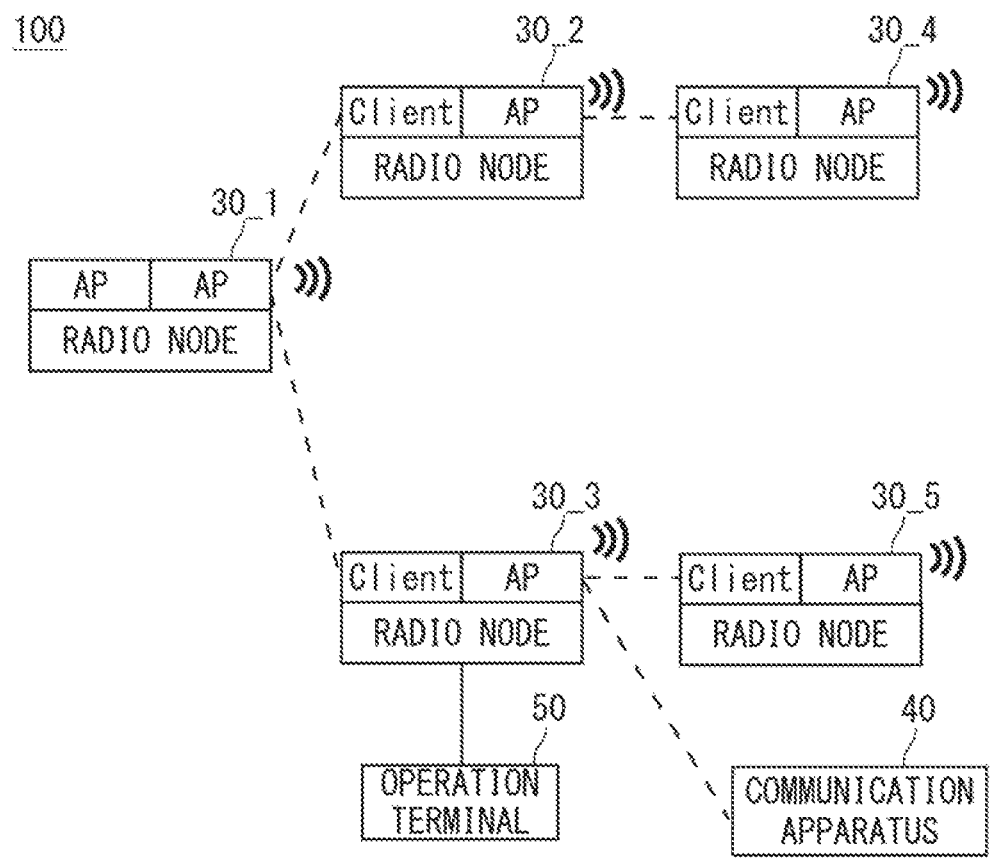
FIG. 2 is a configuration diagram showing a configuration example of a radio communication system according to a first example embodiment.

With reference to FIG. 2, a radio communication system 100 according to a first example embodiment will be described. The radio communication system 100 may be, for example, a wireless LAN system. Alternatively, the radio communication system 100 may be a mobile communication network or the like whose services are provided by communication operators. In the following description, an explanation will be given based on the assumption that the radio communication system 100 is a wireless LAN system. The radio communication system 100 includes radio nodes 30_1-30_5, a communication apparatus 40, and an operation terminal 50.

The radio nodes 30_1-30_5 correspond to the radio node 10 described in the outline of the example embodiments. The radio nodes 30_1-30_5 are radio nodes that construct a network. The radio nodes 30_1-30_5 form a network configuration (network topology) such as a tree network, a ring network, a mesh network, a star network, a fully connected network, or a bus network. In this example embodiment, an explanation will be given based on the assumption that the radio nodes 30_1-30_5 form a tree network configuration.

The radio node 30_1 may be a radio node that is connected to another network such as the Internet (not shown). The radio node 30_1 is a radio node that is arranged at the top of the tree network configuration, and it can also be said that the radio node 30_1 is a root node. It can also be said that the radio node 30_1 is a radio node in the first hierarchy in the tree network.

The radio nodes 30_2 and 30_3 are connected to the radio node 30_1 via a wireless line. It can also be said that the radio nodes 30_2 and 30_3 are radio nodes in the second hierarchy in the tree network. The radio nodes 30_2 and 30_3 are radio nodes whose hierarchical level is lower than that of the radio node 30_1 in the tree network.

The radio node 30_4 is connected to the radio node 30_2 via a wireless line. The radio node 30_5 is connected to the radio node 30_3 via a wireless line. It can also be said that the radio nodes 30_4 and 30_5 are radio nodes in the third hierarchy in the tree network. The radio node 30_4 is a radio node whose hierarchical level is lower than that of the radio node 30_2 in the tree network. The radio node 30_5 is a radio node whose hierarchical level is lower than that of the radio node 30_3 in the tree network.

When, for example, the radio node 30_3 is a target radio node, the radio node 30_5 is a radio node that is connected to the radio node 30_3 and whose hierarchical level in the tree network is lower than that of the radio node 30_3. In this way, the radio node that is connected to the target radio node and whose hierarchical level in the tree network is lower than that of the target radio node may be referred to as a low-order radio node. Further, when the radio node 30_3 is a target radio node, the radio node 30_1 is a radio node that is connected to the radio node 30_3 and whose hierarchical level in the tree network is higher than that of the radio node 30_3. In this way, the radio node that is connected to the target radio node and whose hierarchical level in the tree network is higher than that of the target radio node may be referred to as a high-order radio node.

The radio nodes 30_1-30_5 include communication units that serve as access points (communication units represented by AP in FIG. 2). The radio nodes 30_1-30_5 are respectively connected to low-order radio nodes using the communication units that serve as the access points. Further, each of the radio nodes 30_1-30_5 can be connected to the communication apparatus 40 using the communication units that serve as the access points. As shown in FIG. 2, the radio node 30_3 is connected to the communication apparatus 40 via a wireless line.

Further, the radio nodes 30_2-30_5 include communication units that serve as radio clients (communication units represented by Client in FIG. 2). The radio nodes 30_2-30_5 are connected to a high-order radio node using the communication units that operate as the radio clients.

The communication apparatus 40 corresponds to the communication apparatus 20 in the outline of the example embodiments. The communication apparatus 40 is a communication apparatus capable of performing radio communication. The communication apparatus 40 is a communication apparatus registered from the operation terminal 50. When the communication apparatus 40 is registered from the operation terminal 50, it is allowed to be connected to a network that includes the radio nodes 30_1-30_5. While only one communication apparatus 40 is shown in FIG. 2, two or more communication apparatuses 40 may be provided.

The operation terminal 50 is a communication apparatus for registering the communication apparatus 40. The operation terminal 50 may be, for example, a personal computer, a mobile telephone, a smartphone, a tablet terminal or the like. As shown in FIG. 2, the operation terminal 50 is connected to the radio node 30_3 via a wired line. For example, a manager of the radio communication system 100 registers identification information of the communication apparatus 40 using a dedicated screen 500 provided for the operation terminal 50. The registered identification information of the communication apparatus 40 is transmitted by the radio node 30_3 to other radio nodes, whereby this identification information is shared among the radio nodes 30_1-30_5. The identification information of the communication apparatus 40 may be a Media Access Control (MAC) address. Alternatively, the identification information of the communication apparatus 40 may be the name of a unique apparatus allocated for each communication apparatus, the identifier (ID) of a unique apparatus allocated for each communication apparatus, an Internet Protocol (IP) address or the like. In the following description, an explanation will be given based on the assumption that the identification information of the communication apparatus 40 is a MAC address. While the operation terminal 50 is connected to the radio node 30_3 via a wired line, the operation terminal 50 may be connected to the radio node 30_3 via a wireless line. Further, while only one operation terminal 50 is shown in FIG. 2, two or more operation terminals 50 may be provided.

Figure 3:
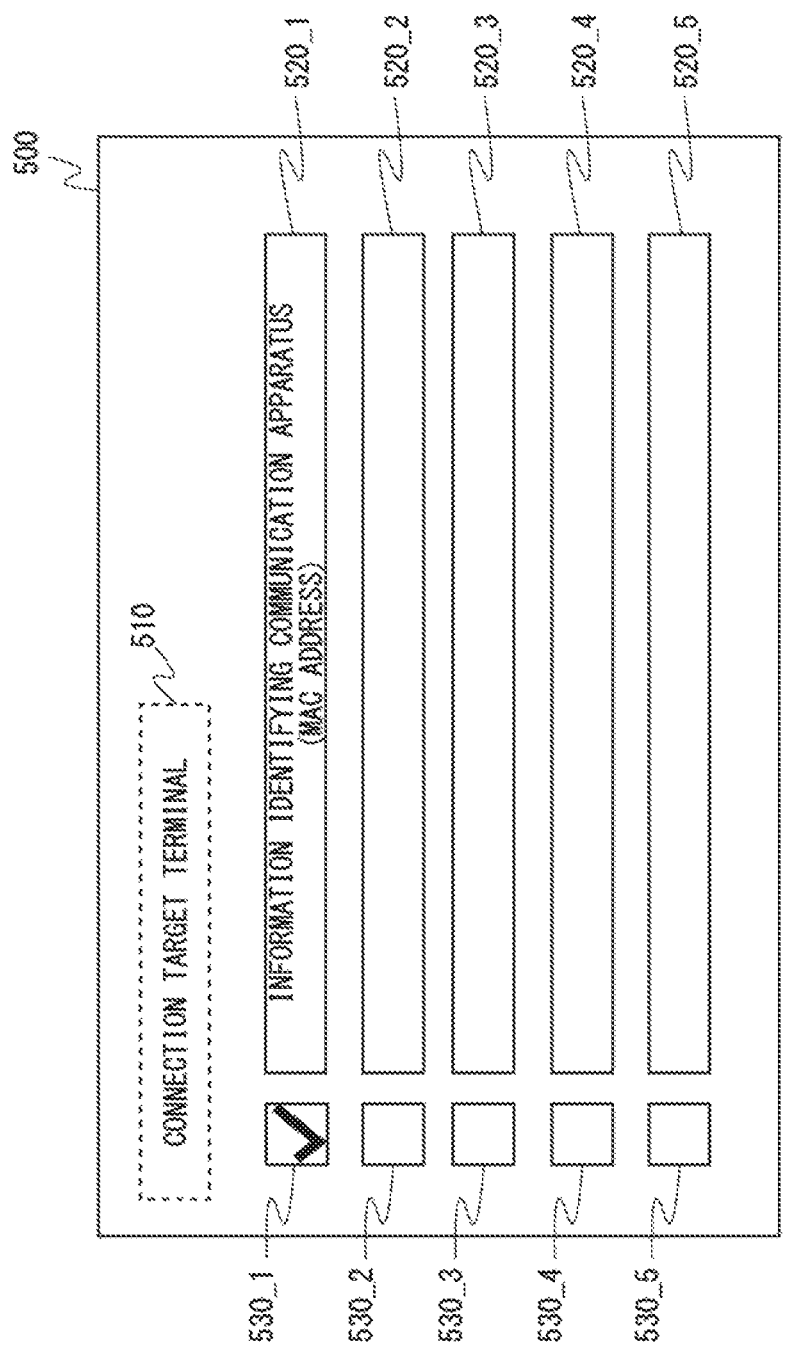
FIG. 3 is a diagram showing one example of a dedicated screen for setting a communication apparatus.

Now, with reference to FIG. 3, the dedicated screen 500 for registering the MAC address of the communication apparatus 40 provided for the operation terminal 50 will be described. FIG. 3 is a diagram showing one example of the dedicated screen for setting the communication apparatus. As shown in FIG. 3, the dedicated screen 500 displays, for example, a label 510 indicating that it is a screen for setting the communication apparatus 40, like "connection target terminal". Input boxes 520_1-520_5 to which the MAC address of the communication apparatus 40 can be input are provided in the dedicated screen 500.

Further, check boxes 530_1-530_5 are provided in the dedicated screen 500. The check to validate the MAC address of the communication apparatus 40 input to the input boxes 520_1-520_5 can be input to the check boxes 530_1-530_5. When the check is input to one of the check boxes 530_1-530_5, the MAC address of the communication apparatus 40 where the check is input is registered in the radio node 30_3. While five input boxes and five check boxes are provided in the dedicated screen 500 shown in FIG. 3, these are merely examples, and the number of input boxes and that of check boxes are not limited thereto.

For example, the manager of the radio communication system 100 connects the operation terminal 50 to the radio node 30_3 to start up the dedicated screen 500. The manager inputs the MAC address of the communication apparatus 40 into one of the input boxes 520_1-520_5. The manager inputs the check into the check box arranged in the same row as the input box into which the MAC address of the communication apparatus 40 has been input in order to validate the input communication apparatus. After that, the MAC address of the communication apparatus 40 into which the check has been input is registered in the radio node 30_3.

Configuration Example of Radio Node 30

Figure 4:
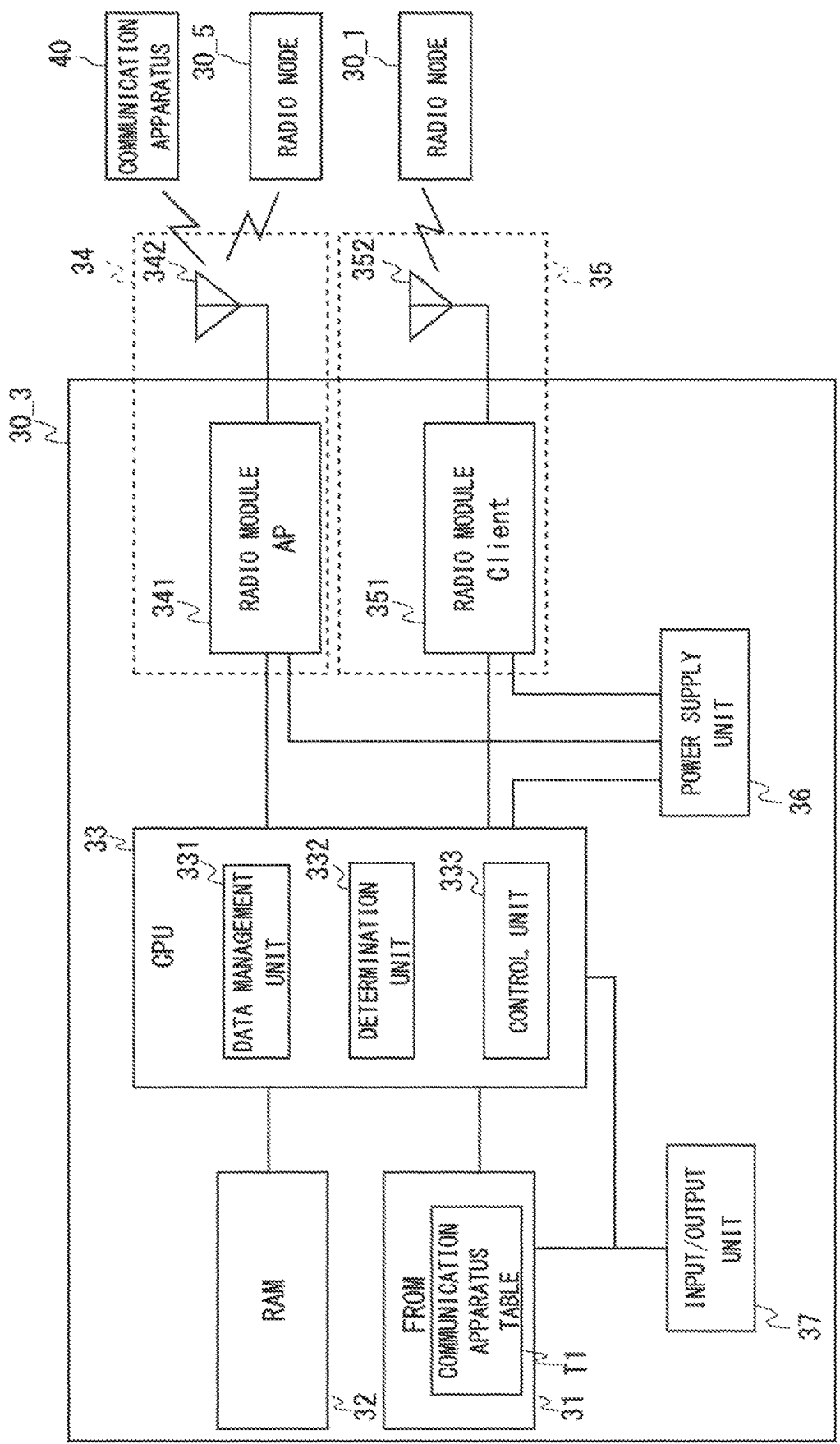
FIG. 4 is a schematic view showing a configuration example of radio nodes according to the first example embodiment.

Referring next to FIG. 4, a configuration example of the radio node according to this example embodiment will be described. FIG. 4 is a configuration diagram showing a configuration example of the radio node according to the first example embodiment. Since the configurations of the radio nodes 30_1-30_5 are basically the same, the common configuration will be first described using the radio node 30_3, and then configurations different from that of the radio node 30_3 will be additionally described. For the sake of simplification of the description, when it is not necessary to specify a specific radio node, they may be referred to as a radio node 30.

Configuration Example of Radio Node 30_3

The radio node 30_3 is a radio node in which the MAC address of the communication apparatus 40 is registered from the operation terminal 50. Further, the radio node 30_3 is a radio node to which the communication apparatus 40 is connected. Further, the radio node 30_3 is a radio node whose connection is released after the communication apparatus 40 is connected thereto.

The radio node 30_3 includes a Flash Read Only Memory (FROM) 31, a Random Access Memory (RAM) 32, a Central Processing Unit (CPU) 33, a communication unit 34, a communication unit 35, a power supply unit 36, and an input/output unit 37.

The FROM 31 stores the MAC address of the communication apparatus 40, and the connection information and system information of the communication apparatus 40. Therefore, it can also be said that the FROM 31 is a storage unit. The connection information may be communication path information of the communication apparatus 40. Alternatively, the connection information may be the number of communication apparatuses 40 that are connected to the radio node 30_3 directly or via the radio node 30_5. Alternatively, the connection information may be information regarding whether or not the communication apparatus 40 connected to the radio node 30_3 directly or via the radio node 30_5 is present. In the following description, an explanation will be given based on the assumption that the connection information is communication path information of the communication apparatus 40.

The FROM 31 stores the MAC address of the communication apparatus 40 and the communication path information of the communication apparatus 40 as a communication apparatus table T1. Referring now to FIG. 5, the communication apparatus table T1 will be described. FIG. 5 is a diagram showing one example of the communication apparatus table. The communication apparatus table T1 is a table that stores the MAC address of the communication apparatus 40 and the communication path information of the communication apparatus 40 in association with each other. The information of the communication path from the communication apparatus 40 to the radio node 30_1, which is a root node, when the communication apparatus 40 is connected to one of the radio nodes 30_1-30_5 is registered as the communication path information. In this example embodiment, an explanation will be given based on the assumption that the communication apparatus 40 has been connected to the radio node 30_3. Note that the communication apparatus table T1 may store other kinds of information.

In one example of the communication apparatus table T1 shown in FIG. 5, the MAC address of the communication apparatus 40 is aa:bb:cc:dd:ee:ff, and the communication path information when the communication apparatus 40 is connected to the radio node 30_3 is registered. The MAC address of the communication apparatus 40 is registered in the MAC address of the communication apparatus table T1. Since the communication apparatus 40 is connected to the radio node 30_1 via the radio node 30_3, "30_1-30_3-40" is registered as the communication path information.

Referring once again to FIG. 4, the explanation of the configuration of the radio node 30_3 will be continued. The RAM 32 is a memory that is used when the information stored in the FROM 31 is saved. Further, the RAM 32 is used to store data for causing the radio node 30_3 to operate as a radio node.

The CPU 33 is connected to the FROM 31, the RAM 32, the communication unit 34, the communication unit 35, the power supply unit 36, and the input/output unit 37 via an internal bus.

The CPU 33 executes the operation of the radio node 30_3 by deploying a program such as firmware stored in the FROM 31 in the RAM 32 and executing this program. The CPU 33 functions as a data management unit 331, a determination unit 332, and a control unit 333 by executing this program stored in the FROM 31.

The data management unit 331 controls the data in the communication apparatus table T1. Specifically, the data management unit 331 accesses the FROM 31, and controls the data by reading out the information registered in the communication apparatus table T1 or writing the information therein.

The data management unit 331 registers the MAC address of the communication apparatus 40 in the MAC address of the communication apparatus table T1 when the MAC address of the communication apparatus 40 is registered from the input/output unit 37. Further, when the communication apparatus 40 has been connected to one of the radio nodes 30_1-30_5, the data management unit 331 registers the communication path information of the communication apparatus 40 in the communication apparatus table T1. Further, when the communication apparatus 40 has released the connection from one of the radio nodes 30_1-30_5, the data management unit 331 clears the communication path information of the communication apparatus table T1.

The determination unit 332 corresponds to the determination unit 12 in the outline of the example embodiments. The determination unit 332 determines whether or not the communication apparatus 40 that transmits data via the communication unit 34 is present under a situation in which all the communication apparatuses 40 are connected to the radio nodes 30_1-30_5.

Specifically, the determination unit 332 determines whether the radio node 30_3 is present in the communication path information by referring to the communication path information of all the communication apparatuses 40 registered in the communication apparatus table T1. When the radio node 30_3 is not included in the communication path information of all the communication apparatuses 40 in the communication apparatus table T1, the determination unit 332 determines that the communication apparatus 40 that transmits data via the communication unit 34 is not present. When the radio node 30_3 is included in the communication path information of one of the communication apparatuses 40 in the communication apparatus table T1, the determination unit 332 determines that the communication apparatus 40 that transmits data via the communication unit 34 is present.

As shown in FIG. 5, "30_1-30_3-40" is registered as the communication path information of the communication apparatus 40 in the communication apparatus table T1. Therefore, since the radio node 30_3 is included in the communication path information of the communication apparatus 40, the determination unit 332 determines that the communication apparatus 40 that transmits data via the communication unit 34 is present.

The control unit 333 corresponds to the control unit 13 in the outline of the example embodiments. The control unit 333 determines whether or not to stop the communication unit 34 in accordance with the results of the determination in the determination unit 332. Specifically, the control unit 333 stops the communication unit 34 when the determination unit 332 determines that the communication apparatus 40 that transmits data via the communication unit 34 is not present. Even when the determination unit 332 has determined that the communication apparatus 40 that transmits data via the communication unit 34 is not present, the control unit 333 does not instantly stop the communication unit 34 if a low-order radio node is present. The control unit 333 stops the communication unit 34 after it has received, from the radio node 30_5, which is the low-order radio node, information indicating that the communication unit 34 of the radio node 30_5 has been stopped. The reason therefor is that, when the communication unit 34 is stopped from the radio node 30_3 whose hierarchical level is high in the tree network, it is possible that the communication with the low-order radio node (radio node 30_5) may be disconnected and the radio node 30_5 may not be able to stop the communication unit 34. Therefore, the radio node 30_3 stops the communication unit 34 of the radio node 30_5 first and then stops the communication unit 34 of the radio node 30_3.

On the other hand, the control unit 333 does not stop the communication unit 34 when the determination unit 332 determines that the communication apparatus 40 that transmits data via the communication unit 34 is present.

Further, when the communication apparatus 40 has been registered in the communication apparatus table T1, the control unit 333 activates the communication unit 34 since it is possible that the communication apparatus 40 may be connected to the communication unit 34. Further, the control unit 333 activates the communication unit 34 when the connection has been released from the radio node to which one of the communication apparatuses 40 is connected and the communication unit 34 has been stopped.

Here, when the control unit 333 stops the communication unit 34, the control unit 333 may stop the communication unit 34 by stopping the power to be supplied to the communication unit 34 from the power supply unit 36. Alternatively, the control unit 333 may instruct the communication unit 34 to stop the operation and the communication unit 34 may stop the operation in accordance with this instruction. Further, when the control unit 333 activates the communication unit 34, the control unit 333 may activate the communication unit 34 by starting supplying power to the communication unit 34 from the power supply unit 36. Alternatively, the control unit 333 may instruct the communication unit 34 to start the operation and the communication unit 34 may start the operation in accordance with this instruction. In the following description, the control unit 333 stops or activates the communication unit 34 by stopping or starting supplying power to the communication unit 34 from the power supply unit 36.

Next, the communication unit 34 will be described. The communication unit 34 corresponds to the communication unit 11 in the outline of the example embodiments. The communication unit 34 corresponds to the communication unit represented by AP in FIG. 2. The communication unit 34 is a communication unit for operating the radio node 30_3 as an access point. Therefore, it can also be said that the communication unit 34 is an access point communication unit.

The communication unit 34 includes a radio module 341 and an antenna 342. The radio module 341 complies with, for example, The Institute of Electrical and Electronics Engineers (IEEE) 802.11 standards and is connected to the communication apparatus 40 or to the low-order radio node through the antenna 342 via a wireless line.

The communication unit 34 periodically transmits a beacon signal in order to search for the apparatus that is present in the communication area of the radio node 30_3. The communication unit 34 is connected to the communication apparatus 40 when the communication unit 34 has received a probe request from the apparatus that is present in the communication area and the apparatus that has transmitted a probe request is the communication apparatus 40. When the communication unit 34 has received a probe request from the low-order radio node that is present in the communication area, the communication unit 34 is connected to the low-order radio node. Since the communication apparatus 40 and the radio node 30_5 are present in the communication area of the radio node 30_3, the radio node 30_3 is connected to the communication apparatus 40 and the radio node 30_5.

When the MAC address of the communication apparatus 40 has been registered from the operation terminal 50, the communication unit 34 is activated since it is possible that the communication apparatus 40 may be connected to the communication unit 34. Further, when the MAC address of the communication apparatus 40 has been registered and the communication unit 34 has been connected to the radio node 30_5, which is a low-order radio node, the communication unit 34 transmits the MAC address of the communication apparatus 40 to the radio node 30_5. The communication unit 34 communicates with the radio node 30_5, thereby sharing the MAC address of the communication apparatus 40 with other radio nodes.

When the communication apparatus 40 has been connected to the communication unit 34, the communication unit 34 transmits the communication path information of the communication apparatus 40 to the radio node 30_5. Specifically, the communication unit 34 transmits the communication path information from the communication apparatus 40 to the radio node 30_3 to the radio node 30_5. The communication unit 34 shares the communication path information of the communication apparatus 40 with other radio nodes by communicating with the radio node 30_5. Note that the communication unit 34 may transmit, to the radio node 30_5, the communication path information from the communication apparatus 40 to the radio node 30_1.

When the communication apparatus 40 has been registered, the radio node 30_3 is able to recognize the communication path information on the communication path from the communication apparatus 40 to the radio node 30_1 since the radio node 30_3 has established the communication path with the radio node 30_1. In a similar way, when the communication apparatus 40 has been registered, the radio node 30_5 is able to recognize the communication path information on the communication path from the communication apparatus 40 to the radio node 30_1 since the radio node 30_5 has established the communication path with the radio node 30_1 via the radio node 30_3. Therefore, when the communication apparatus 40 has been connected to the radio nodes 30_3 and 30_5, the radio nodes 30_3 and 30_5 register the communication path information from the communication apparatus 40 to the radio node 30_1 in the communication apparatus table T1.

The communication unit 34 transmits, when the communication apparatus 40 has released the connection, the connection release information of the communication apparatus 40 and information indicating that the communication path information of the communication apparatus 40 has been cleared to the radio node 30_5. The communication unit 34 shares the connection release information of the communication apparatus 40 and information indicating that the communication path information of the communication apparatus 40 has been cleared with other radio nodes by communicating with the radio node 30_5.

Further, as described above, even when the determination unit 332 has determined that the communication apparatus 40 that transmits data via the communication unit 34 is not present, the control unit 333 does not instantly stop the communication unit 34 if the low-order radio node is present. In this case, it is possible that the communication unit 34 may receive, from the radio node 30_5, the information indicating that the communication unit 34 of the radio node 30_5 has been stopped. Therefore, the communication unit 34 continues to wait until it receives, from the radio node 30_5, the information indicating that the communication unit 34 of the radio node 30_5 has been stopped. Specifically, when it has been determined that the control unit 333 stops the communication unit 34, the communication unit 34 activates a predetermined timer and waits for reception of the information indicating that the communication unit 34 of the radio node 30_5 has been stopped from the radio node 30_5 until the timer expires. When the information indicating that the communication unit 34 of the radio node 30_5 has been stopped has been transmitted from the radio node 30_5, the communication unit 34 receives the information indicating that the communication unit 34 of the radio node 30_5 has been stopped.

Next, the communication unit 35 will be described. The communication unit 35 corresponds to the communication unit represented by Client in FIG. 2. The communication unit 35 is a communication unit that is connected to a communication unit that functions as an access point of the high-order radio node. When the radio node 30_3 is connected to the radio node 30_1, it can also be said that the radio node 30_3 corresponds to a slave device, the radio node 30_1 being a master device. Therefore, it can also be said that the communication unit 35 is a client communication unit that operates as a client function.

The communication unit 35 includes a radio module 351 and an antenna 352. The radio module 351, which complies with, for example, IEEE 802.11 standards, is connected to the radio node 30_1 via the antenna 352.

Upon receiving a beacon signal from the communication unit 34 of the high-order radio node, the communication unit 35 transmits a probe request and is connected to the communication unit 34 of the high-order radio node. Since the radio node 30_1, which is the high-order radio node, is present, the radio node 30_3 is connected to the radio node 30_1.

When the MAC address of the communication apparatus 40 has been registered from the operation terminal 50, the communication unit 35 transmits the MAC address of the communication apparatus 40 to the radio node 30_1. The communication unit 35 shares the MAC address of the communication apparatus 40 with other radio nodes by communicating with the radio node 30_1.

When the radio node 30_3 has been connected to the communication apparatus 40, the communication unit 35 transmits communication path information of the communication apparatus 40 to the radio node 30_1. Specifically, the communication unit 35 transmits, to the radio node 30_1, the communication path information from the communication apparatus 40 to the radio node 30_3. The communication unit 35 shares the communication path information of the communication apparatus 40 with other radio nodes by communicating with the radio node 30_1.

When the communication apparatus 40 has released the connection, the communication unit 35 transmits the connection release information of the communication apparatus 40 and information indicating that the communication path information of the communication apparatus 40 has been cleared to the radio node 30_1. The communication unit 35 shares the connection release information of the communication apparatus 40 and information indicating that the communication path information of the communication apparatus 40 has been cleared with other radio nodes by communicating with the radio node 30_1.

When the control unit 333 has stopped the power supply to the communication unit 34, the communication unit 35 transmits, to the high-order radio node, information indicating that the communication unit 34 has been stopped. Note that the radio node 30_3 does not stop the communication unit 34 since the determination unit 332 determines that the communication apparatus 40 that transmits data via the communication unit 34 is present. Therefore, the communication unit 35 of the radio node 30_3 does not transmit, to the radio node 30_1, information indicating that the communication unit 34 of the radio node 30_3 has been stopped.

The power supply unit 36, which is, for example, a commercial AC power supply or a battery, supplies power to the communication unit 34 and the communication unit 35. When the control unit 333 stops the communication unit 34, the power supply unit 36 stops the power to be supplied to the communication unit 34. On the other hand, when the control unit 333 does not stop the communication unit 34 or activates the communication unit 34, the power supply unit 36 continues supplying power to the communication unit 34 or starts supplying power, which has been stopped. While the power supply unit 36 is embedded in the radio node 30_3 in FIG. 4, it may be provided outside the radio node 30_3.

The input/output unit 37 functions as an output unit as well as an input unit. The input/output unit 37 is connected to the operation terminal 50 via a communication interface (not shown) and the MAC address of the communication apparatus 40 input from the dedicated screen 500 of the operation terminal 50 is registered. The MAC address of the communication apparatus 40 that has been registered is registered in the communication apparatus table T1 by the data management unit 331.

Further, when the operation terminal 50 has been connected to the input/output unit 37 and the input/output unit 37 has received a request for outputting information on the communication apparatus 40 from the operation terminal 50, the input/output unit 37 outputs the MAC address registered in the communication apparatus table T1 and the communication path information to the operation terminal 50.

Configuration Example of Radio Node 30_1

Next, regarding the radio node 30_1, only the differences from the radio node 30_3 will be described. The radio node 30_1 is a root node of the tree network. The radio node 30_1 is mainly different from the radio node 30_3 in terms of the configurations of the communication units 34 and 35.

First, the communication unit 34 will be described. While the communication unit 34 of the radio node 30_3 is activated after the communication apparatus 40 is registered, the radio node 30_1 always maintains the communication unit 34 to be activated. That is, the communication unit 34 is always connected to the communication units 35 of the radio nodes 30_2 and 30_3.

When the communication unit 34 has received information regarding the communication apparatus 40 from the radio node 30_3, the communication unit 34 transmits the received information to the radio node 30_2. Further, when the communication unit 34 has received information regarding the communication apparatus 40 from the radio node 30_2, the communication unit 34 transmits the received information to the radio node 30_3.

When the MAC address of the communication apparatus 40 has been registered in the radio node 30_3, the communication unit 34 receives the MAC address of the communication apparatus 40 from the radio node 30_3. Then the communication unit 34 transmits the MAC address of the communication apparatus 40 to the radio node 30_2. The MAC address of the communication apparatus 40 that has been received is registered in the communication apparatus table T1 by the data management unit 331.

When the communication apparatus 40 has been connected to the radio node 30_3, the communication unit 34 receives the communication path information of the communication apparatus 40 from the radio node 30_3. Specifically, the communication unit 34 receives, from the radio node 30_3, the communication path information on the communication path from the communication apparatus 40 to the radio node 30_3. Then the communication unit 34 transmits the communication path information of the communication apparatus 40 to the radio node 30_2. The communication unit 34 adds information on the communication path to the radio node 30_1 to the communication path information of the communication apparatus 40 that has been received and transmits the obtained information to the radio node 30_2. That is, the communication unit 34 transmits, to the radio node 30_2, the communication path information on the communication path from the communication apparatus 40 to the radio node 30_1. The data management unit 331 registers the communication path information on the communication path from the communication apparatus 40 to the radio node 30_1 in the communication apparatus table T1.

When the communication apparatus 40 has released the connection from the radio node 30_3, the communication unit 34 receives the connection release information of the communication apparatus 40 and information indicating that the communication path information of the communication apparatus 40 has been cleared from the radio node 30_3. Then the communication unit 34 transmits, to the radio node 30_2, the connection release information of the communication apparatus 40 and information indicating that the communication path information of the communication apparatus 40 has been cleared. The data management unit 331 clears the communication path information of the communication apparatus 40 from the communication apparatus table T1.

When all the communication apparatuses 40 are connected, the communication unit 34 of the radio node 30_2 is stopped. Then the communication unit 34 receives, from the radio node 30_2, information indicating that the communication unit 34 of the radio node 30_2 has been stopped.

Next, the communication unit 35 will be described. Since the radio node 30_1 is a root node, the high-order radio node is not present. Therefore, the radio node 30_1 does not operate even when it includes the communication unit 35. Alternatively, the radio node 30_1 may function the communication unit 35 as the communication unit that serves as an access point.

Configuration Example of Radio Node 30_2

Next, regarding the radio node 30_2, only the differences from the radio node 30_3 will be described. The radio node 30_2 is a radio node that is arranged between the radio node 30_1 and the radio node 30_4 and that relays the communication between the radio node 30_1 and the radio node 30_4. The radio node 30_2 is mainly different from the radio node 30_3 in terms of the configurations of the communication units 34 and 35.

When the MAC address of the communication apparatus 40 has been registered in the radio node 30_3, the communication unit 34 transmits the MAC address of the communication apparatus 40 received from the radio node 30_1, which is the high-order radio node, to the radio node 30_4, which is the low-order radio node.

When the communication apparatus 40 has been connected to the radio node 30_3, the communication unit 34 transmits the communication path information of the communication apparatus 40 received from the radio node 30_1 to the radio node 30_4. Specifically, since the communication unit 35 receives, from the radio node 30_1, the communication path information on the communication path from the communication apparatus 40 to the radio node 30_1, the communication unit 34 directly transmits the received communication path information to the radio node 30_4.

When the communication apparatus 40 has released the connection from the radio node 30_3, the communication unit 34 receives, from the radio node 30_1, the connection release information of the communication apparatus 40 and information indicating that the communication path information of the communication apparatus 40 has been cleared, and transmits these information items to the radio node 30_4.

When the radio node 30_4 has stopped the communication unit 34, the communication unit 34 receives, from the radio node 30_4, information indicating that the communication unit 34 of the radio node 30_4 has been stopped. As shown in FIG. 5, since 30_1-30_3-40 is registered as the communication path information of the communication apparatus table T1 and the radio node 30_2 is not included in the communication path information, the control unit 333 stops the communication unit 34. The control unit 333 stops the communication unit 34 after the communication unit 34 has received, from the radio node 30_4, information indicating that the communication unit 34 of the radio node 30_4 has been stopped.

Next, the communication unit 35 will be described. When the MAC address of the communication apparatus 40 has been registered in the radio node 30_3, the communication unit 35 receives the MAC address of the communication apparatus 40 from the radio node 30_1. The MAC address of the communication apparatus 40 that has been received is registered in the communication apparatus table T1 by the data management unit 331.

When the communication apparatus 40 has been connected to the radio node 30_3, the communication unit 35 receives the communication path information of the communication apparatus 40 from the radio node 30_1. Specifically, the radio node 30_2 receives the communication path information on the communication path from the communication apparatus 40 to the radio node 30_1 from the radio node 30_1. The received communication path information is registered in the communication apparatus table T1 by the data management unit 331.

When the communication apparatus 40 has released the connection from the radio node 30_3, the communication unit 35 receives, from the radio node 30_1, the connection release information of the communication apparatus 40 and information indicating that the communication path information of the communication apparatus 40 has been cleared. The data management unit 331 clears the communication path information of the communication apparatus 40 in the communication apparatus table T1.

When the control unit 333 has stopped the communication unit 34, the communication unit 35 transmits information indicating that the communication unit 34 of the radio node 30_2 has been stopped to the radio node 30_1.

As described above, in this example embodiment, the communication apparatus 40 is registered in the radio node 30_3, the communication apparatus 40 is connected to the radio node 30_3, and the communication apparatus 40 releases the connection from the radio node 30_3. Therefore, the communication unit 35 receives the information on the communication apparatus 40 from the radio node 30_1 and the communication unit 34 transmits the information on the communication apparatus 40 to the radio node 30_4.

Another case in which, for example, the communication apparatus 40 is registered in the radio node 30_4, the communication apparatus 40 is connected to the radio node 30_4, and the communication apparatus 40 releases the connection from the radio node 30_4 can also be considered. In this case, the communication unit 34 receives the information on the communication apparatus 40 from the radio node 30_4 and the communication unit 35 transmits the information on the communication apparatus 40 to the radio node 30_1. Note that when the communication apparatus 40 has been connected to the radio node 30_4, the communication unit 34 receives, from the radio node 30_4, communication path information on the communication path from the communication apparatus 40 to the radio node 30_4. When the communication unit 35 transmits the communication path information of the communication apparatus 40 to the radio node 30_1, the communication unit 35 adds the radio node 30_2 to the received communication path information and transmits information on the communication path from the communication apparatus 40 to the radio node 30_2. Note that the communication unit 35 may transmit, to the radio node 30_1, the information on the communication path from the communication apparatus 40 to the radio node 30_1.

Configuration Example of Radio Node 30_4

Next, the radio nodes 30_4 and 30_5 will be described. While the radio node 30_4 is connected to the radio node 30_2, there is no low-order radio node that is connected to the radio node 30_4. In a similar way, while the radio node 30_5 is connected to the radio node 30_3, there is no low-order radio node that is connected to the radio node 30_5. Therefore, the radio nodes 30_4 and 30_5 do not transmit information on the communication apparatus 40 to other radio nodes via the communication unit 34, unlike the radio node 30_3.

Operation Example of Radio Communication System and Radio Node

Next, an operation example of the radio node 30 and the radio communication system 100 will be described.

Operation Example when Communication Apparatus is Registered

Figure 6:
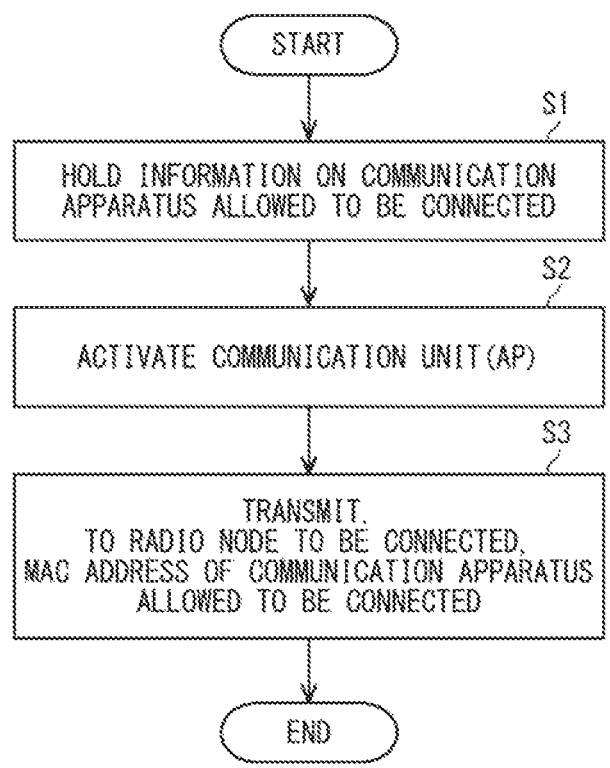
FIG. 6 is a flowchart showing an operation example of the radio node when the communication apparatus is registered.

Referring first to FIG. 6, an operation example of the radio node 30 when the communication apparatus 40 has been registered will be described. FIG. 6 is a flowchart showing an operation example of the radio node when the communication apparatus has been registered. FIG. 6 is an operation example performed when the communication apparatus 40 has been registered in the radio node 30. Further, FIG. 6 is also an operation example performed when the radio node 30 has received the MAC address of the communication apparatus 40 from another radio node.

First, an operation example when the communication apparatus 40 has been connected to the radio node 30 will be described. When the operation terminal 50 has been connected and the MAC address of the communication apparatus 40 has been registered, the operation shown in FIG. 6 is started. When the MAC address of the communication apparatus 40 has been registered, the radio node 30 holds the MAC address of the communication apparatus 40 (Step S1). Specifically, the radio node 30 registers the MAC address of the communication apparatus 40 in the communication apparatus table T1.

Next, the radio node 30 registers the MAC address of the communication apparatus 40 in the communication apparatus table T1. When the communication unit 34 has not been activated, the radio node 30 activates the communication unit 34 (Step S2). Next, the radio node 30 transmits the MAC address of the communication apparatus 40 to the radio node that is connected to the radio node 30 (Step S3). Specifically, the radio node 30 transmits the MAC address of the communication apparatus 40 to the low-order radio node using the communication unit 34, and transmits the MAC address of the communication apparatus 40 to the high-order radio node using the communication unit 35.

Next, an operation example in the case in which the MAC address of the communication apparatus 40 has been received will be described. Upon receiving the MAC address of the communication apparatus 40, the radio node 30 holds the MAC address of the communication apparatus 40 (Step S1). Specifically, the radio node 30 registers the MAC address of the communication apparatus 40 in the communication apparatus table T1.

Next, the radio node 30 registers the MAC address of the communication apparatus 40 in the communication apparatus table T1. When the communication unit 34 has not been activated, the radio node 30 activates the communication unit 34 (Step S2). Next, the radio node 30 transmits the MAC address of the communication apparatus 40 to the radio node connected to the radio node 30 (Step S3). Specifically, the radio node 30 transmits the MAC address of the communication apparatus 40 to the low-order radio node using the communication unit 34, and transmits the MAC address of the communication apparatus 40 to the high-order radio node using the communication unit 35.

Figure 7:
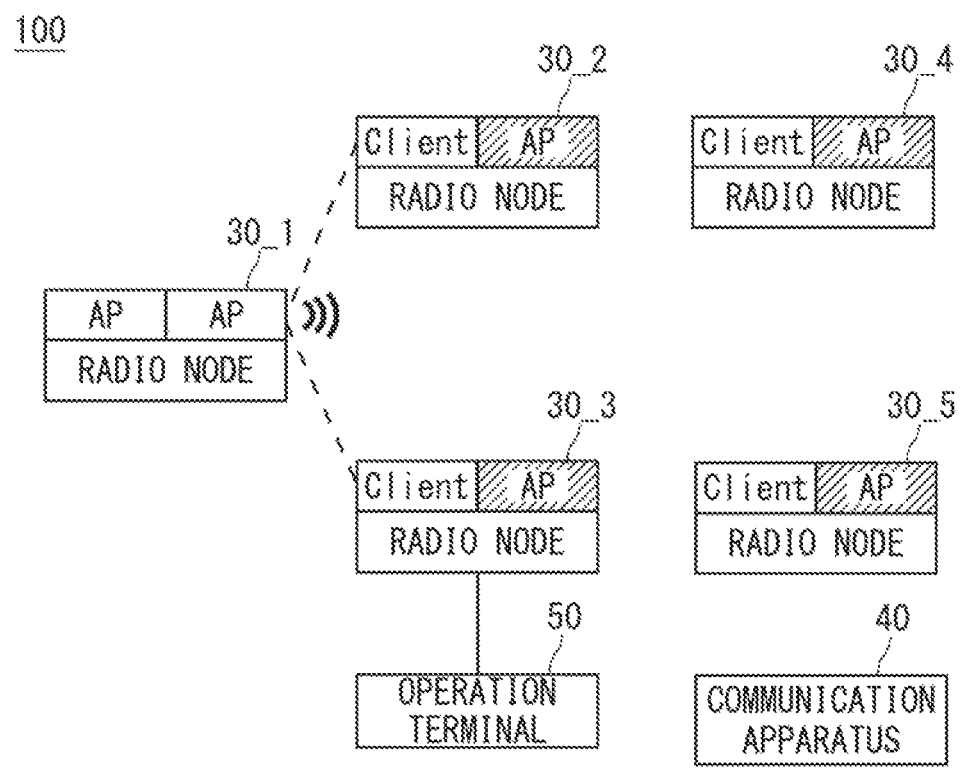
FIG. 7 is a diagram showing a state before the communication apparatus is registered.
Figure 8:
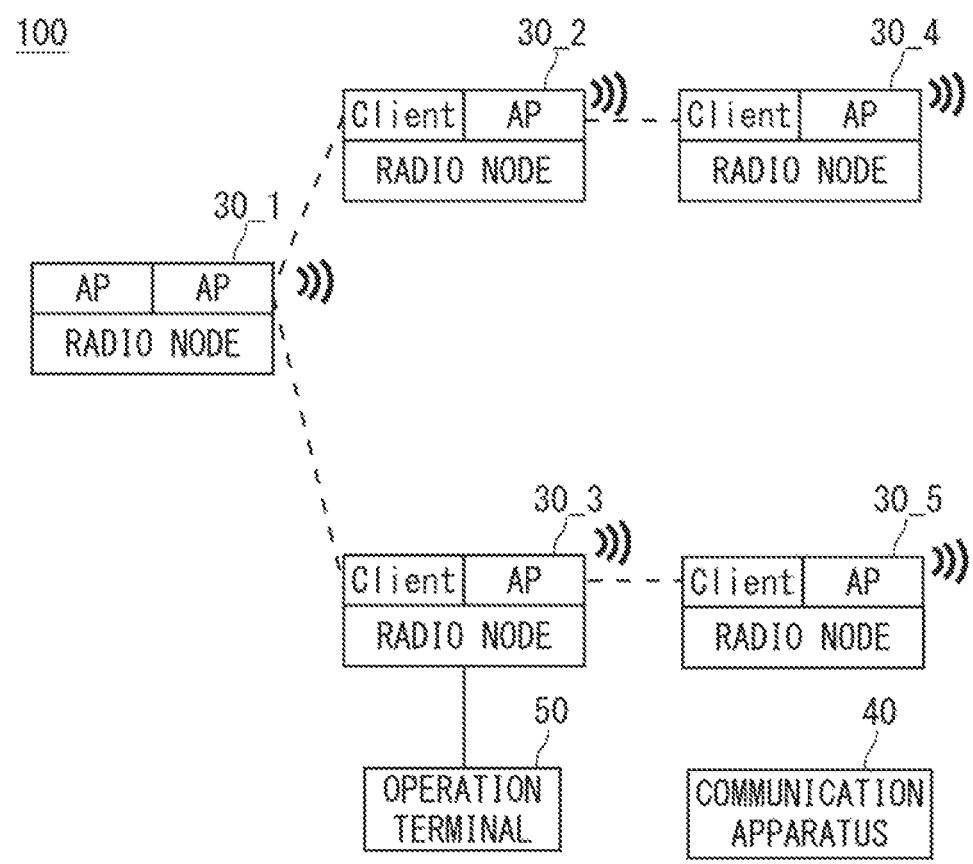
FIG. 8 is a diagram showing a state after the communication apparatus is registered.

Referring next to FIGS. 7 and 8, an operation example of the radio communication system 100 when the communication apparatus 40 has been registered will be described. FIG. 7 is a diagram showing a state before the communication apparatus 40 is registered. FIG. 8 is a diagram showing a state after the communication apparatus is registered.

As shown in FIG. 7, the communication apparatus 40 is present in the communication area of the radio node 30_3 and the operation terminal 50 is connected to the radio node 30_3. The radio nodes 30_2 and 30_3 are connected to the radio node 30_1. Since the communication apparatus 40 has not been registered, the communication unit 34 of each of the radio nodes 30_2 and 30_3 has been stopped. The radio node 30_5 has not been connected to the radio node 30_3 since the communication unit 34 of the radio node 30_3 has not been activated although the communication unit 35 has been activated. Further, since the communication apparatus 40 has not been registered in the radio node 30_5, the communication unit 34 of the radio node 30_5 has been stopped.

In the above state, the MAC address of the communication apparatus 40 is registered in the radio node 30_3. Then the radio node 30_3 registers the MAC address of the communication apparatus 40 in the communication apparatus table T1. The radio node 30_3 activates the communication unit 34 since it is possible that the communication apparatus 40 may be connected to the radio node 30_3. Then the radio node 30_3 transmits the MAC address of the communication apparatus 40 to the radio node 30_1 connected to the radio node 30_3 via the communication unit 35.

The radio node 30_1 registers the received MAC address of the communication apparatus 40 in the communication apparatus table T1. Since the radio node 30_1 has already activated the communication unit 34, the radio node 30_1 transmits the MAC address of the communication apparatus 40 to the radio node 30_2.

The radio node 30_2 registers the MAC address of the communication apparatus 40 in the communication apparatus table T1. The radio node 30_2 activates the communication unit 34 since it is possible that the registered communication apparatus 40 may be connected to the radio node 30_2. The radio node 30_2 transmits the MAC address of the communication apparatus 40 to the radio node 30_4 connected to the radio node 30_2 via the communication unit 34.

The radio node 30_4 registers the MAC address of the communication apparatus 40 in the communication apparatus table T1. Since it is possible that the registered communication apparatus 40 may be connected to the radio node 30_4, the radio node 30_4 starts supplying power to the communication unit 34 to activate the communication unit 34. The radio node 30_4 ends the operation since the low-order radio node is not present.

Since the radio node 30_5 is connected to the radio node 30_3 when the communication unit 34 of the radio node 30_3 is activated, the radio node 30_5 receives the MAC address of the communication apparatus 40 via the communication unit 35. The radio node 30_5 registers the MAC address of the communication apparatus 40 in the communication apparatus table T1. Since it is possible that the communication apparatus 40 may be connected to the radio node 30_5, the radio node 30_5 activates the communication unit 34. When the radio node 30_5 is connected to the radio node 30_3, the radio node 30_5 operates in accordance with an operation example when an apparatus is connected, which will be described later.

FIG. 8 shows a state after all the radio nodes perform the aforementioned operation. As shown in FIG. 8, in each of the radio nodes 30_1-30_5, the communication unit 34 is activated. Then each of the radio nodes 30_1-30_5 periodically transmits a beacon signal from the communication unit 34 and searches for the communication apparatus 40. As shown in FIG. 8, in this state, the communication apparatus 40 is not connected to the radio node 30_3 although it is present in the communication area of the radio node 30_3.

Operation Example when Apparatus is Connected

Figure 9:
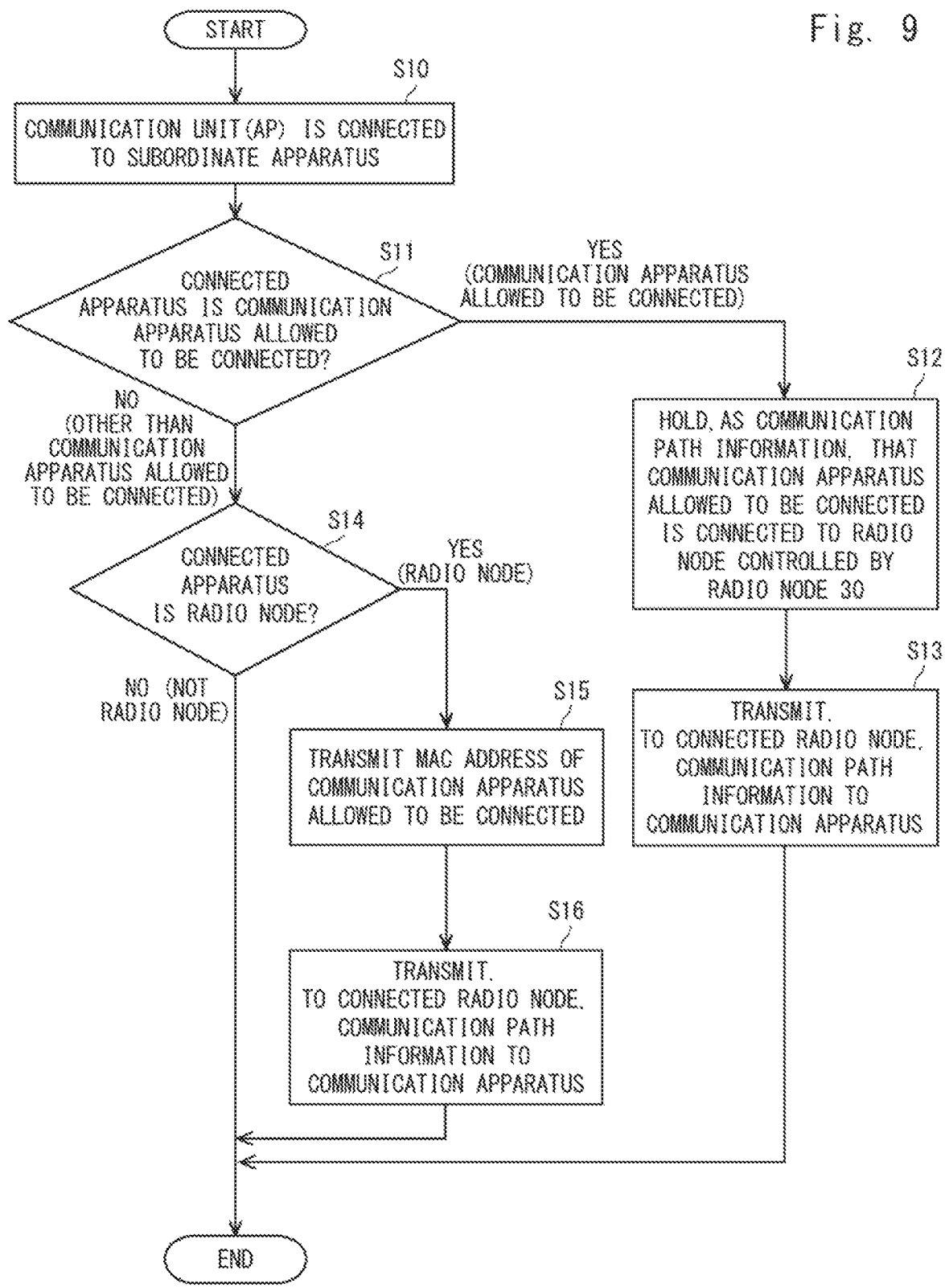
FIG. 9 is a flowchart showing an operation example of the radio node when the apparatus is connected.

Referring next to FIG. 9, an operation example in a case in which an apparatus is connected to the radio node 30 will be described. FIG. 9 is a flowchart showing the operation example of the radio node when the apparatus is connected to the radio node 30.

When the apparatus that is present in the communication area is connected to the radio node 30 (Step S10), the radio node 30 refers to the MAC address of the communication apparatus 40 of the communication apparatus table T1 and determines whether the connected apparatus is the communication apparatus 40 (Step S11). When the connected apparatus is the communication apparatus 40 (YES in Step S11), the radio node 30 is connected to the communication apparatus 40 and registers the communication path information of the communication apparatus 40 in the communication apparatus table T1 (Step S12).

Now, the radio node 30 recognizes the communication path information on the communication path from the radio node 30_1, which is a root node, to the radio node 30, when the communication apparatus 40 has been registered. Therefore, the radio node 30 registers the communication path information on the communication path from the radio node 30_1, which is a root node, to the communication apparatus 40, in the communication apparatus table T1.

Next, the radio node 30 transmits the communication path information of the communication apparatus 40 to the radio node connected to the radio node 30 (Step S13). On the other hand, when the connected apparatus is not the communication apparatus 40 and is another radio node or another communication apparatus to which connection is not possible in Step S11 (NO in Step S11), the radio node 30 determines whether the connected apparatus is a radio node (Step S14). When the connected apparatus is a radio node (YES in Step S14), the radio node 30 is connected to this radio node and transmits the MAC address of the communication apparatus 40 (Step S15). Further, when the radio node 30 receives the communication path information of the communication apparatus 40 from another radio node, the radio node 30 transmits the communication path information of the communication apparatus 40 to the connected radio node (Step S16). Further, when the connected apparatus is not the communication apparatus 40 or when it is not a radio node in Step S14, the process is ended.

Referring next to FIGS. 8 and 2, an operation example of the radio communication system 100 when the communication apparatus 40 is connected to the radio node 30_3 will be described. FIG. 8 shows a state before the communication apparatus 40 is connected to the radio node 30_3. FIG. 2 shows a state when the communication apparatus 40 is connected to the radio node 30_3.

As shown in FIG. 8, the communication apparatus 40 is present in the communication area of the radio node 30_3 and is not connected to the radio node 30_3. The radio nodes 30_2 and 30_3 are connected to the radio node 30_1 and the radio node 30_4 is connected to the radio node 30_2. The following description will be made based on the assumption that the radio node 30_5 has already been connected to the radio node 30_3. It is further assumed that, after the radio node 30_3 is connected to the radio node 30_5, the radio node 30_3 transmits the MAC address of the communication apparatus 40.

In the above state, the communication apparatus 40 is connected. When the apparatus that is present in the communication area is connected to the radio node 30_3, the radio node 30_3 refers to the communication apparatus table T1 and determines whether the connected apparatus is the communication apparatus 40. Since the connected apparatus is the communication apparatus 40, the radio node 30_3 is connected to the communication apparatus 40 and registers the communication path information of the communication apparatus 40 in the communication apparatus table T1. The radio node 30_3 registers the communication path information on the communication path from the communication apparatus 40 to the radio node 30_1 in the communication apparatus table T1. That is, the radio node 30_3 registers "30_1-30_3-40" as the communication path information of the communication apparatus table T1.

The radio node 30_3 transmits the communication path information of the communication apparatus 40 to the radio nodes 30_1 and 30_5. Specifically, the radio node 30_3 transmits, to the radio nodes 30_1 and 30_5, the communication path information from the communication apparatus 40 to the radio node 30_3. The radio nodes 30_1 and 30_5 register the communication path information on the communication path from the communication apparatus 40 to the radio node 30_1 in the communication apparatus table T1 based on the communication path information of the communication apparatus 40 received from the radio node 30_3. Specifically, the radio nodes 30_1 and 30_5 also register "30_1-30_3-40" as the communication path information of the communication apparatus table T1.

The radio node 30_1 adds the radio node 30_1 to the received communication path information of the communication apparatus 40 and transmits, to the radio node 30_2, the communication path information on the communication path from the communication apparatus 40 to the radio node 30_1. The radio node 30_5 ends the operation since the low-order radio node is not present.

The radio node 30_2 registers the communication path information on the communication path from the communication apparatus 40 to the radio node 30_1 in the communication apparatus table T1 based on the communication path information of the communication apparatus 40 received from the radio node 30_1. Specifically, the radio node 30_2 also registers "30_1-30_3-40" in the communication apparatus table T1. The radio node 30_2 directly transmits the received communication path information to the radio node 30_4, which is under the control of the radio node 30_2. The radio node 30_4 also registers "30_1-30_3-40" as the communication path information of the communication apparatus table T1. The radio node 30_4 ends the operation since the low-order radio node is not present.

FIG. 2 shows a state after all the radio nodes have performed the aforementioned operation. In each of the radio nodes 30_1-30_5, the communication path information on the communication path from the communication apparatus 40 to the radio node 30_1 has been registered in the communication apparatus table T1. The radio nodes 30_1-30_5 do not stop the communication unit 34 until all the communication apparatuses 40 are connected. That is, the communication unit 34 of each of the radio nodes 30_1-30_5 periodically transmits a beacon signal and keeps a state in which it waits for the communication apparatus 40 to be connected.

Operation Example when all Communication Apparatuses are Connected

Figure 10:
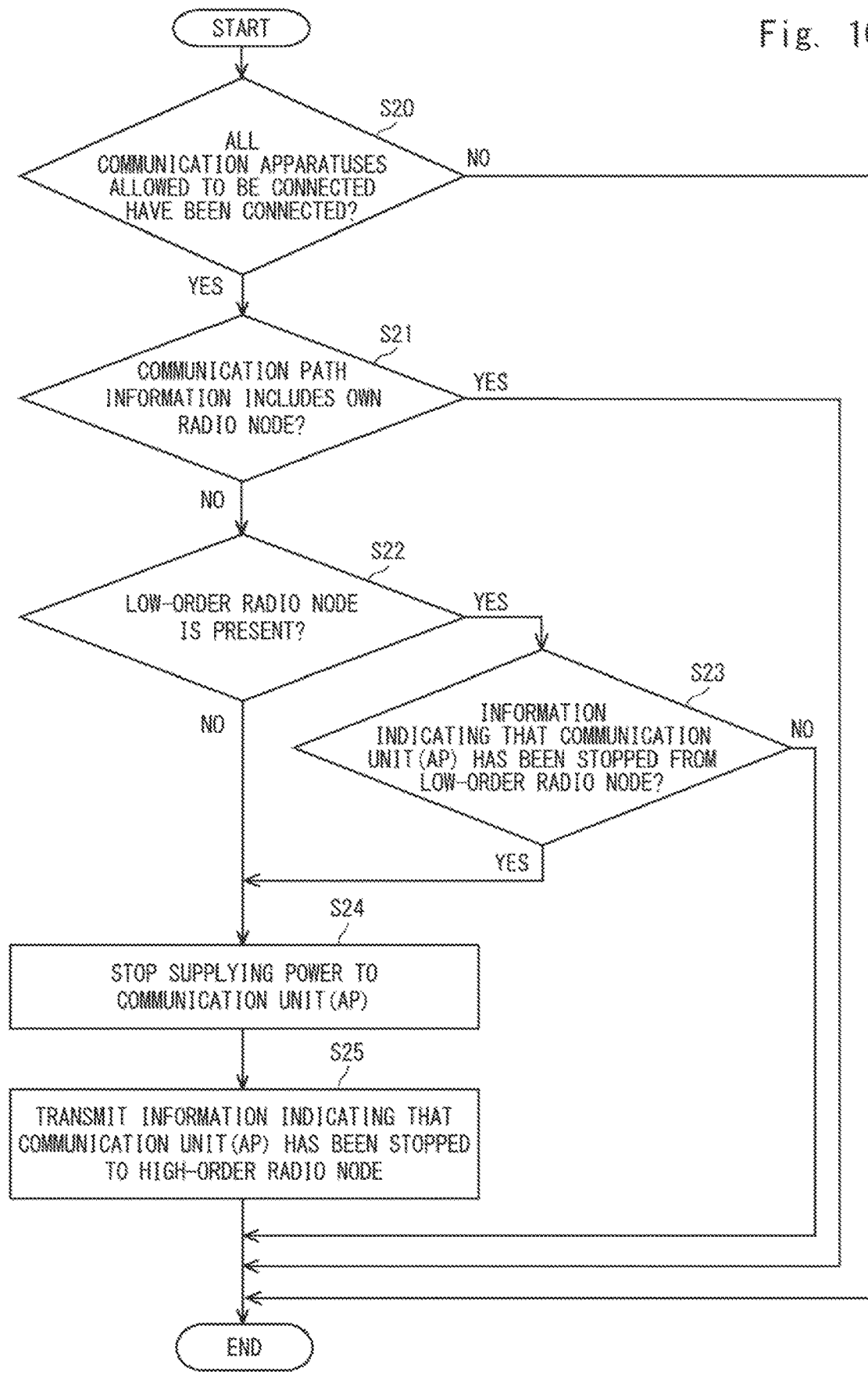
FIG. 10 is a flowchart showing an operation example of the radio node when all the communication apparatuses are connected.

Referring next to FIG. 10, an operation example of the radio node 30 when all the communication apparatuses 40 are connected will be described. FIG. 10 is a flowchart showing an operation example of the radio node when all the communication apparatuses are connected. The radio node 30 may perform the operation shown in FIG. 10 every time one of the communication apparatuses registered in the communication apparatus table T1 is connected. Alternatively, the radio node 30 may periodically perform the operation shown in FIG. 10.

First, the radio node 30 determines whether or not all the communication apparatuses 40 registered in the communication apparatus table T1 have been connected (Step S20). When all the communication apparatuses 40 have been connected (YES in Step S20), the radio node 30 determines whether the radio node 30 is included in communication path information of all the communication apparatuses 40, (Step S21). When the radio node 30 is included in the communication path information of one of the communication apparatuses 40 (YES in Step S21), the radio node 30 ends the processing since it is determined that the communication apparatus 40 that transmits data via the communication unit 34 is present. That is, in this case, the radio node 30 continues supplying power to the communication unit 34.

On the other hand, when the radio node 30 is not included in the communication path information of all the communication apparatuses 40 (NO in Step S21), the radio node 30 determines that the communication apparatus 40 that transmits data via the communication unit 34 is not present. Even in this case, however, the radio node 30 does not instantly stop the communication unit 34 and determines whether the low-order radio node is present (Step S22).

When it is determined in Step S22 that the low-order radio node is not present (NO in Step S22), the power supply to the communication unit 34 is stopped (Step S24). Then the radio node 30 transmits information indicating that the communication unit 34 of the radio node 30 has been stopped to the high-order radio node (Step S25).

When it is determined in Step S22 that the low-order radio node is present (YES in Step S22), the radio node 30 waits for the reception of the information indicating that the communication unit 34 of the low-order radio node has been stopped from the low-order radio node. In this case, the radio node 30 starts the timer and continues waiting until the timer expires. Upon receiving the information indicating that the communication unit 34 of the low-order radio node has been stopped from the low-order radio node (YES in Step S23), the radio node 30 stops supplying power to the communication unit 34 (Step S24), and transmits the information indicating that the communication unit 34 of the radio node 30 has been stopped to the high-order radio node (Step S25).

On the other hand, when the radio node 30 does not receive the information indicating that the communication unit 34 of the low-order radio node has been stopped from the low-order radio node until the activated timer expires (NO in Step S23), the radio node 30 ends the processing.

Figure 11:
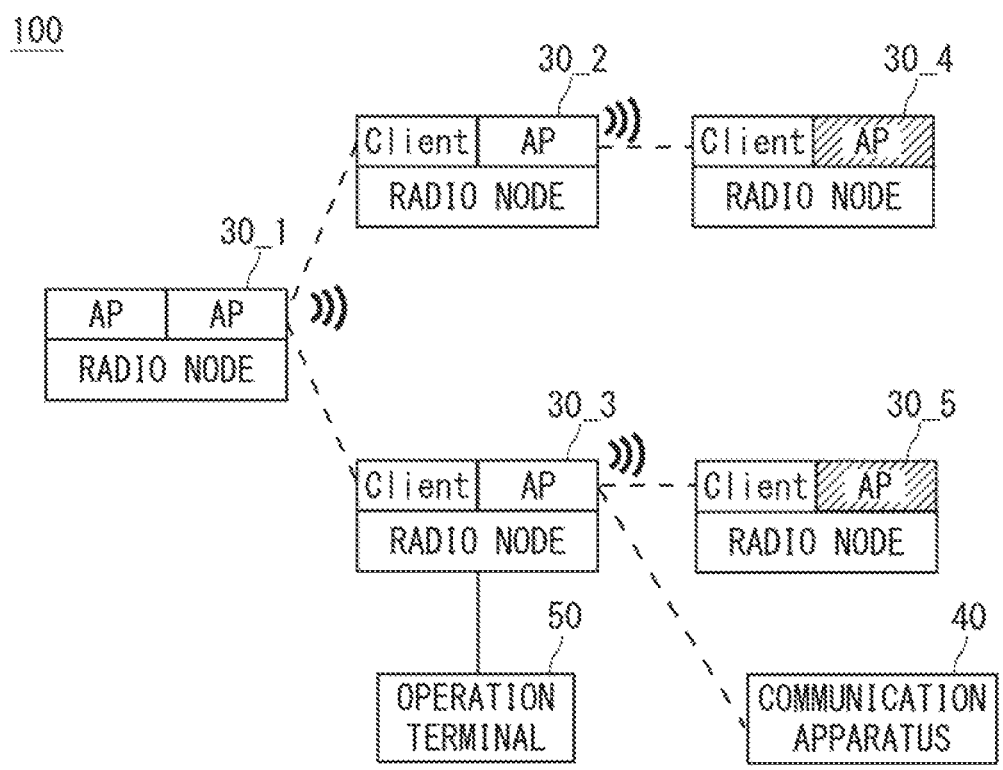
FIG. 11 is a diagram showing a state 1 after all the communication apparatuses are connected.
Figure 12:
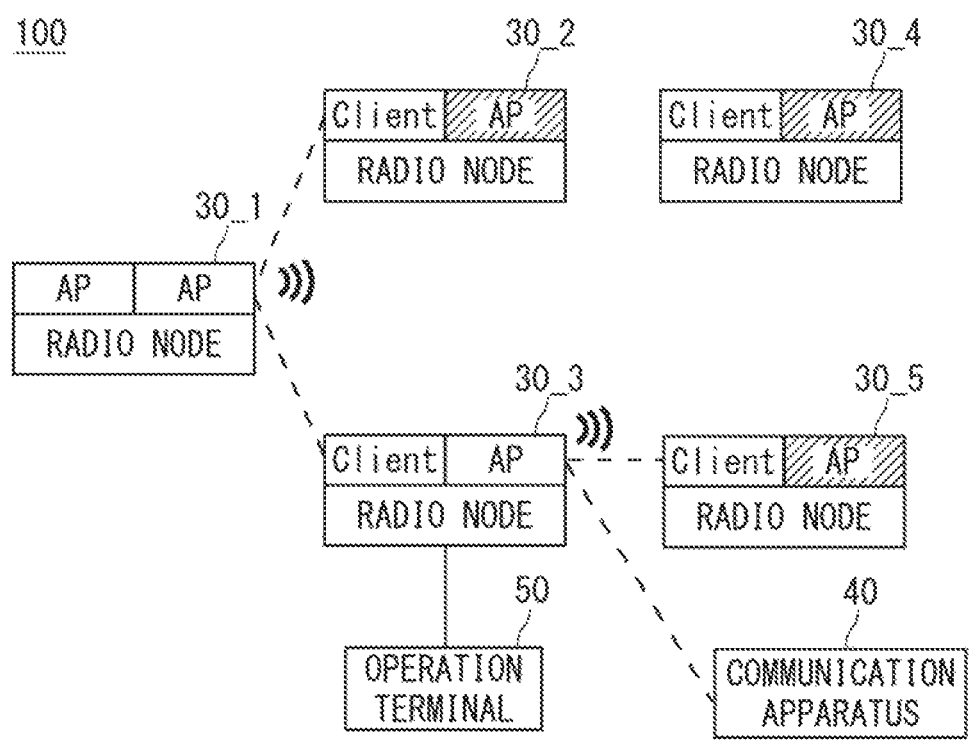
FIG. 12 is a diagram showing a state 2 after all the communication apparatuses are connected.

Referring next to FIGS. 2, 11, and 12, an operation example of the radio communication system 100 when all the communication apparatuses 40 are connected will be described. FIG. 2 is a diagram showing a state just after all the communication apparatuses are connected. FIG. 11 is a diagram showing a state 1 after all the communication apparatuses are connected. FIG. 12 is a diagram showing a state 2 after all the communication apparatuses are connected.

As shown in FIG. 2, shortly after all the communication apparatuses 40 are connected to the radio node 30_3, the communication unit 34 of each of the radio nodes 30_1-30_5 is not stopped. In this state, since the low-order radio node is not present, the radio node 30_4 determines whether or not the communication path information of the communication apparatus table T1 includes the radio node 30_4. The radio node 30_4 determines that the communication apparatus 40 that transmits data via the communication unit 34 is not present since "30_1-30_3-40" is registered as the communication path information of the communication apparatus table T1 and the communication path information does not include the radio node 30_4. Therefore, the radio node 30_4 stops supplying power to the communication unit 34 of the radio node 30_4 and transmits the information indicating that the communication unit 34 of the radio node 30_4 has been stopped to the radio node 30_2.

Further, since the low-order radio node is not present, the radio node 30_5 also determines whether or not the communication path information of the communication apparatus table T1 includes the radio node 30_5. The radio node 30_5 also determines that the communication apparatus 40 that transmits data via the communication unit 34 is not present since "30_1-30_3-40" is registered as the communication path information of the communication apparatus table T1 and it is determined that the communication path information does not include the radio node 30_5. Therefore, the radio node 30_5 also stops the communication unit 34 of the radio node 30_5 and transmits, to the radio node 30_3, information indicating that the power supply to the communication unit 34 of the radio node 30_5 has been stopped.

FIG. 11 shows a state after the aforementioned operation is performed. As shown in FIG. 11, in each of the radio nodes 30_4 and 30_5, the communication unit 34 has been stopped. After that, the radio node 30_2 receives, from the radio node 30_4, information indicating that the power supply to the communication unit 34 of the radio node 30_4 has been stopped. Further, the radio node 30_3 receives information indicating that the power supply to the communication unit 34 of the radio node 30_5 has been stopped from the radio node 30_5.

In the radio node 30_2 as well, "30_1-30_3-40" is registered as the communication path information of the communication apparatus table T1, and the radio node 30_2 determines that the communication path information does not include the radio node 30_2. Therefore, the radio node 30_2 also determines that the communication apparatus 40 that transmits data via the communication unit 34 is not present, and stops the communication unit 34 of the radio node 30_2. The radio node 30_2 transmits information indicating that the communication unit 34 of the radio node 30_2 has been stopped to the radio node 30_1.

Upon receiving information indicating that the power supply to the communication unit 34 of the radio node 30_5 has been stopped from the radio node 30_5, the radio node 30_3 determines whether the radio node 30_3 is included in the communication path information of the communication apparatus table T1. The radio node 30_3 also determines that the communication path information includes the radio node 30_3 since "30_1-30_3-40" is also registered as the communication path information of the communication apparatus table T1 in the radio node 30_3 as well. Therefore, the radio node 30_3 determines that the communication apparatus 40 that transmits data via the communication unit 34 is present, and does not stop the communication unit 34 of the radio node 30_3.

Upon receiving information indicating that the power supply to the communication unit 34 of the radio node 30_2 has been stopped from the radio node 30_2, the radio node 30_1 determines whether the radio node 30_1 is included in the communication path information of the communication apparatus table T1. Since "30_1-30_3-40" is registered as the communication path information of the communication apparatus table T1 in the radio node 30_2 as well, the radio node 30_1 determines that the communication path information includes the radio node 30_1. Therefore, it is determined that the communication apparatus 40 that transmits data via the communication unit 34 is present and the communication unit 34 of the radio node 30_1 is not stopped.

FIG. 12 shows a state after the aforementioned operation is completed. As shown in FIG. 12, each of the radio nodes 30_2, 30_4, and 30_5 stops the communication unit 34 since there is no possibility that the communication apparatus 40 is connected thereto. On the other hand, each of the radio nodes 30_1 and 30_3 does not stop the communication unit 34 since one of the communication apparatuses 40 transmits data via the communication unit 34.

As described above, when all the communication apparatuses 40 are connected, each of the radio nodes 30_1-30_5 stops the communication unit 34 of itself when there is no communication apparatus 40 that transmits data via the communication unit 34 of itself. Therefore, it is possible to stop wasteful radio wave output and save power in the radio communication system 100.

Figure 13:
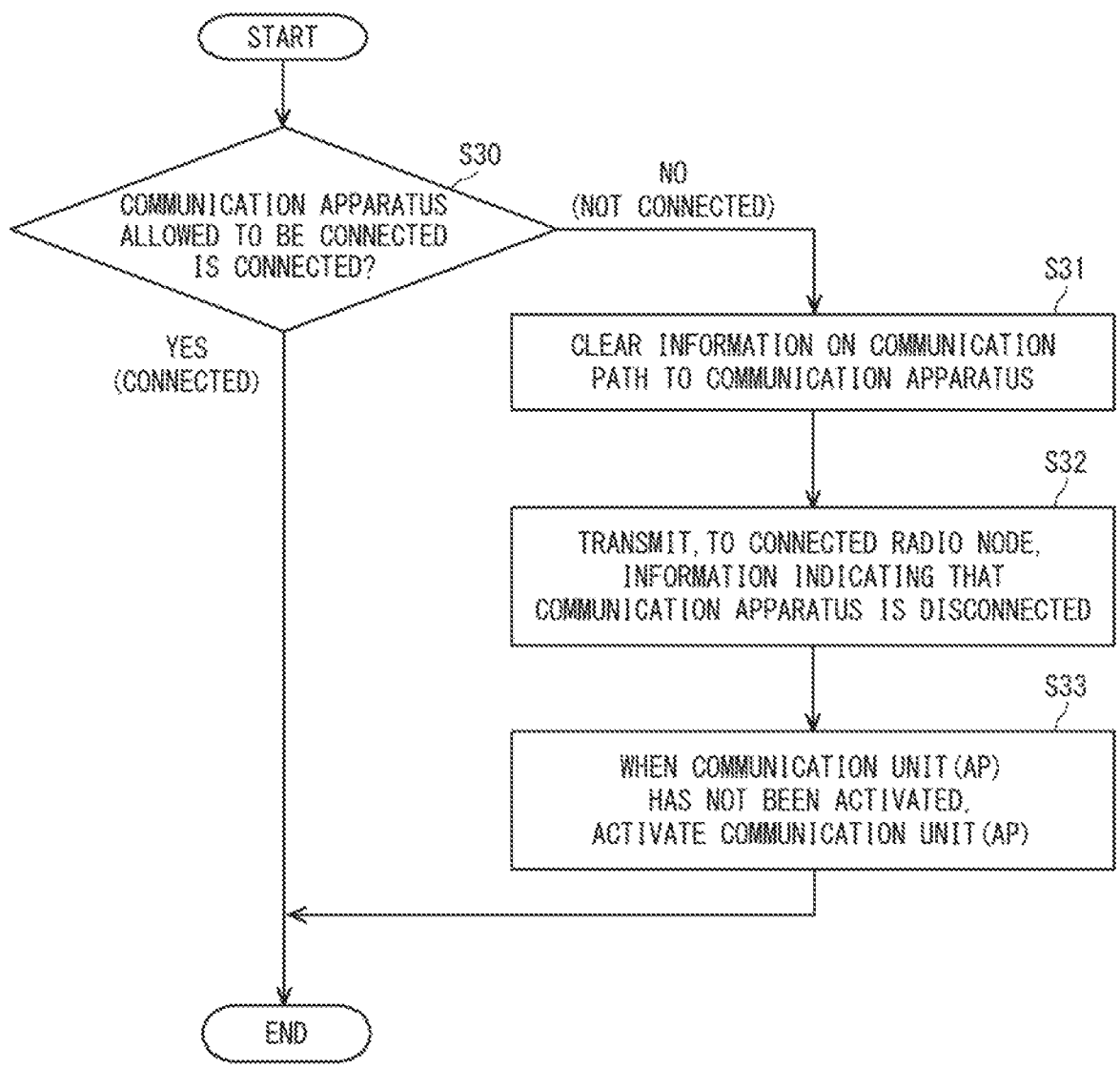
FIG. 13 is a flowchart showing an operation example of the radio node when one of the communication apparatuses has released the connection or one of the communication apparatuses has moved.

Operation Example when Connection of Communication Apparatus has been Released or when Communication Apparatus has Moved Referring next to FIG. 13, an operation example of the radio node 30 when one of the communication apparatuses 40 has released the connection or one of the communication apparatuses 40 has moved will be described. FIG. 13 is a flowchart showing an operation example of a radio node when one of the communication apparatuses has been released the connection or one of the communication apparatuses has moved.

FIG. 13 shows an operation in which the radio node 30 to which the communication apparatus 40 is connected (e.g., the radio node 30_3 in FIG. 12) periodically performs. Further, the operation shown in FIG. 13 is the one performed by the radio node 30 that has received the connection release information of the communication apparatus 40.

First, an operation example of the radio node 30 to which the communication apparatus 40 is connected (e.g., the radio node 30_3 in FIG. 12) will be described. The radio node 30 determines whether or not the communication apparatus 40 that has been connected to the radio node 30 is still connected thereto (Step S30). When the communication apparatus 40 that has been connected to the radio node 30 has released the connection (NO in Step S30), the radio node 30 clears the communication path information of the communication apparatus 40 (Step S31).

Next, the radio node 30 transmits, to the radio node to which it is connected, information indicating that the communication apparatus 40 has released the connection and information indicating that the communication path information of the communication apparatus 40 has been cleared (Step S32). When the communication unit 34 has not been activated, the radio node 30 activates the communication unit 34 (Step S33). On the other hand, when the communication apparatus 40 is still connected to the radio node 30 (YES in Step S30), the radio node 30 ends the processing.

Next, an operation example performed by the radio node 30 that has received the connection release information of the communication apparatus 40 will be described. First, when the radio node 30 has received the connection release information of the communication apparatus 40, it is determined that one of the communication apparatuses 40 has not been connected (NO in Step S30). Then the radio node 30 clears the communication path information of the communication apparatus 40 (Step S31). Next, the radio node 30 transmits, to the radio node to which it is connected, information indicating that the communication apparatus 40 has released the connection and information indicating that the communication path information of the communication apparatus 40 has been cleared (Step S32). When the radio node 30 has not activated the communication unit 34 of itself, the radio node 30 activates this communication unit 34 (Step S33). On the other hand, when the connection release information of the communication apparatus 40 has not been received (YES in Step S30), the radio node 30 ends the processing.

Next, with reference to FIGS. 12, 14, and 15, an operation example of the radio communication system 100 when one of the communication apparatuses 40 has released the connection or one of the communication apparatuses 40 has moved will be described. Since the operation of the radio communication system 100 in the case in which the communication apparatus 40 has released the connection is the same as that in the case in which the communication apparatus 40 has moved, an operation example of the radio communication system 100 in the case in which the communication apparatus 40 has moved will be described.

FIG. 12 shows a state before the communication apparatus 40 moves. FIG. 14 is a diagram showing a state before the communication apparatus that has moved is connected to the radio node to which the communication apparatus has moved. FIG. 15 is a diagram showing a state after the communication apparatus that has moved is connected to the radio node to which the communication apparatus has moved.

As shown in FIG. 12, the communication apparatus 40 is present in the communication area of the radio node 30_3 and is connected to the radio node 30_3. The radio nodes 30_2, 30_4, and 30_5 stop supplying power to the communication unit 34. It is assumed that the communication apparatus 40 has moved to the communication area of the radio node 30_4 from the above state. Then the radio node 30_3 clears the communication path information of the communication apparatus 40 in the communication apparatus table T1 in order to release the connection with the communication apparatus 40.

Since the communication apparatus 40 has not been connected to the radio nodes 30_1-30_5 and it is possible that the communication apparatus 40 may be connected, the radio node 30_3 tries to activate the communication unit 34. However, since the radio node 30_3 has already activated the communication unit 34, the radio node 30_3 maintains the communication unit 34 to be activated. Then the radio node 30_3 transmits the connection release information of the communication apparatus 40 and information indicating that the communication path information of the communication apparatus 40 has been cleared to the radio nodes 30_1 and 30_5.

Upon receiving the connection release information of the communication apparatus 40 from the radio node 30_3, the radio node 30_5 clears the communication path information of the communication apparatus 40 in the communication apparatus table T1. The radio node 30_5 activates the communication unit 34 since it is possible that the communication apparatus 40 may be connected to the radio node 30_5 and the communication unit 34 has been stopped.

Upon receiving the connection release information of the communication apparatus 40 from the radio node 30_3, the radio node 30_1 clears the communication path information of the communication apparatus 40 in the communication apparatus table T1. Since the radio node 30_1 has already activated the communication unit 34, the radio node 30_1 maintains the communication unit 34 to be activated. The radio node 30_1 transmits the connection release information of the communication apparatus 40 has been disconnected and information indicating that the communication path information of the communication apparatus 40 has been cleared to the radio node 30_2.

Upon receiving the connection release information of the communication apparatus 40 from the radio node 30_1, the radio node 30_2 clears the communication path information of the communication apparatus 40 in the communication apparatus table T1. The radio node 30_2 starts supplying power to the communication unit 34 since it is possible that the communication apparatus 40 may be connected to the radio node 30_2 and the communication unit 34 has been stopped. The radio node 30_2 transmits the connection release information of the communication apparatus 40 and information indicating that the communication path information of the communication apparatus 40 has been cleared to the radio node 30_4.

Upon receiving the connection release information of the communication apparatus 40 from the radio node 30_2, the radio node 30_4 clears the communication path information of the communication apparatus 40 in the communication apparatus table T1. The radio node 30_4 starts supplying power to the communication unit 34 since it is possible that the communication apparatus 40 may be connected to the radio node 30_4 and the communication unit 34 has been stopped. The radio node 30_4 ends the processing since the low-order radio node is not present.

Figure 14:
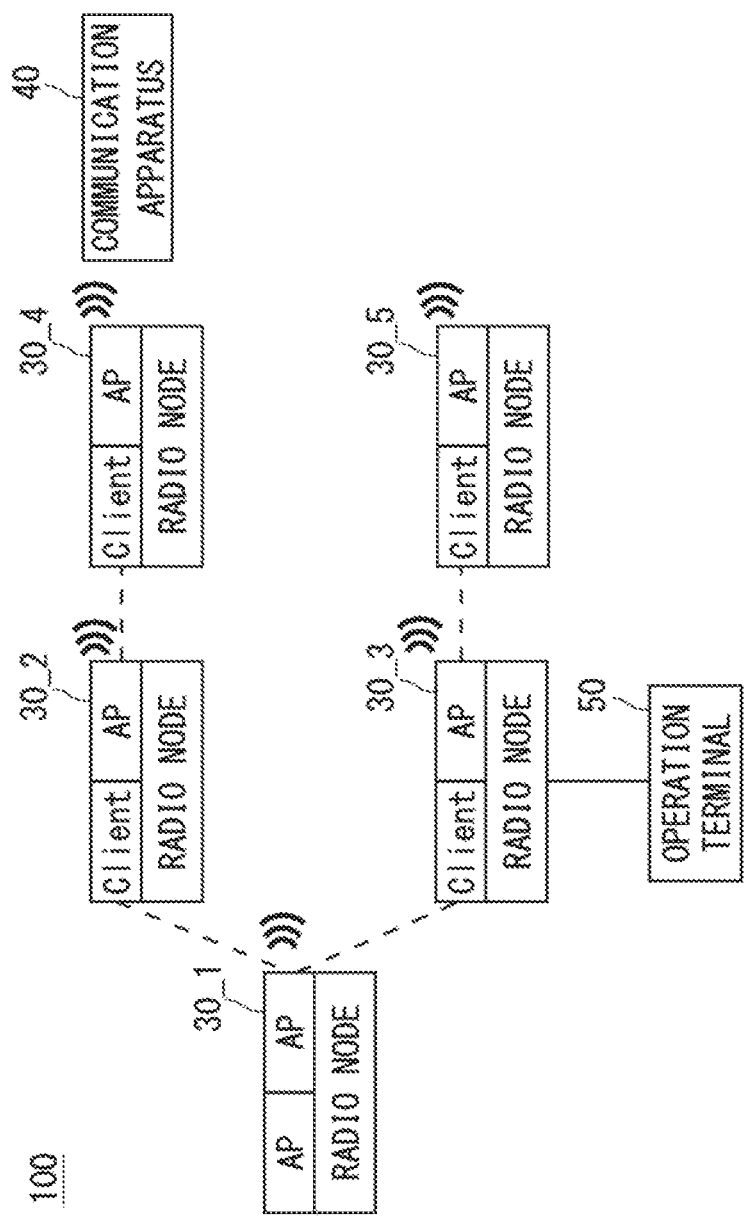
FIG. 14 is a diagram showing a state before the communication apparatus that has moved is connected to a radio node to which the communication apparatus has moved.

FIG. 14 shows a state before the communication apparatus 40 that has moved is connected to the radio node 30_4 to which the communication apparatus 40 has moved. As shown in FIG. 14, the communication unit 34 of each of all the radio nodes is activated since it is possible that the communication apparatus 40 may be connected to all the radio nodes. After that, the communication apparatus 40 is connected to the radio node 30_4 since the communication apparatus 40 is present in the communication area of the radio node 30_4. When the communication apparatus 40 is connected, operations similar to those described in the aforementioned operation example in the case in which the communication apparatus is connected are performed. Further, operations similar to those in the aforementioned operation example in the case in which all of the communication apparatuses are connected is performed.

Figure 15:
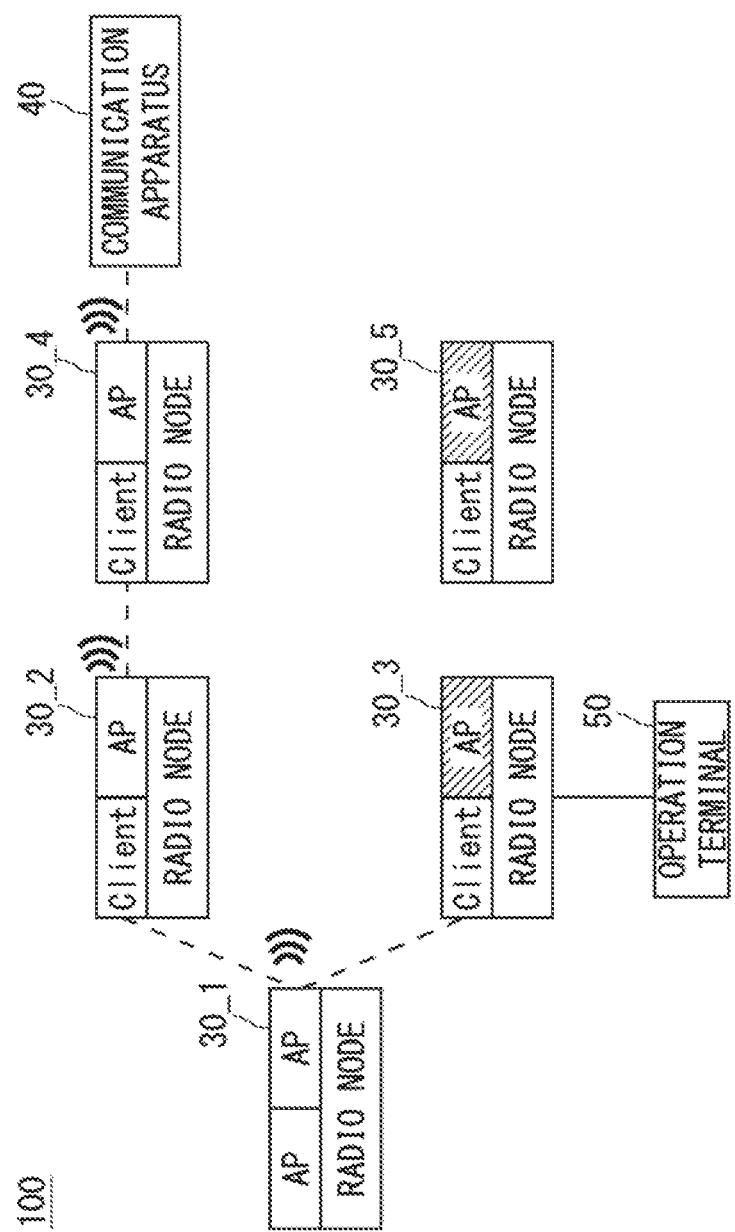
FIG. 15 is a diagram showing a state after the communication apparatus that has moved is connected to the radio node to which the communication apparatus has moved.

FIG. 15 shows a state in which the communication apparatus 40 that has moved is connected to the radio node 30_4. FIG. 15 shows a state after all the communication apparatuses 40 are connected. As shown in FIG. 15, each of the radio nodes 30_3 and 30_5 stops supplying power to the communication unit 34 of itself since it is determined that the communication apparatus 40 that transmits data via the communication unit 34 is not present.

As described above, even when the communication apparatus 40 has moved from the radio node 30_3 to the radio node 30_4, each of the radio nodes 30_3 and 30_5 determines that the communication apparatus 40 that transmits data via the communication unit 34 is not present and stops supplying power to the communication unit 34. It is therefore possible to stop wasteful radio wave output and save power in the radio communication system 100.

As described above, the determination unit 332 determines whether or not the communication apparatus 40 that transmits data via the communication unit 34 is present under a situation in which all the communication apparatuses 40 are connected. When the determination unit 332 determines that the communication apparatus 40 that transmits data via the communication unit 34 is not present, the control unit 333 stops the communication unit 34. In this case, since each of all the communication apparatuses 40 is connected to one of the radio nodes 30_1-30_5, there is no possibility that the communication apparatus 40 may be connected. That is, the communication unit 34 does not need to periodically transmit the beacon signal and search for the communication apparatus 40. Therefore, with the use of the radio node 30 according to this example embodiment, it becomes possible to stop unnecessary radio wave emission and to save power in the radio communication system 100.

Further, with the use of the radio node 30 according to this example embodiment, it becomes possible to stop unnecessary radio wave emission, whereby it is possible to reduce frequency interference in the radio communication network. The upper limit of the number of channels to be used in the radio communication is fixed according to communication standards. The radio node according to the related art operates to select a channel and output radio waves when the communication unit 34 is activated. For example, even when a radio communication system in which radio nodes whose number exceeds the upper limit of the number of channels are arranged is used, it is still possible to perform communication. In this radio communication system, however, communication that involves radio wave interference between radio nodes (frequency interference) is performed. That is, in this radio communication system, it is possible that the communication quality may be degraded. Therefore, even when radio nodes whose number exceeds the upper limit of the number of channels are arranged, it is still desired to keep the possibility that the frequency interference occurs low. In the radio node 30 according to this example embodiment, it becomes possible to stop unnecessary radio wave emission, whereby it is possible to release the unnecessary channels. That is, even when the radio nodes whose number exceeds the upper limit of the number of channels are arranged in the radio communication system 100, it becomes possible to reduce the frequency interference. Therefore, with the use of the radio node 30 according to this example embodiment, it is possible to improve the communication quality of the entire radio communication system 100.

Further, according to the radio node 30 of this example embodiment, by registering each of the communication apparatuses 40 in one of the radio nodes, the communication apparatuses 40 are registered in all the radio nodes. Therefore, the manager of the radio communication system 100 does not need to register information on the communication apparatus 40 in all the radio nodes. Further, the above manager may register information on the communication apparatus 40 in the radio node that is the closest to the location where he/she is present. Therefore, with the use of the radio node 30 according to this example embodiment, it is possible to reduce the burden of performing personal settings by the manager, whereby it is possible to improve the user convenience, the operation efficiency, and the management efficiency.

Furthermore, the radio node 30 according to this example embodiment stops the communication unit 34 when it is not required to transmit radio waves from the communication unit 34 of itself. That is, in the radio communication system 100, the number of radio nodes 30 that can be connected is limited to the minimum number that is required. Therefore, even when a malicious user tries to illegally access the radio communication system 100, if the communication unit 34 of the radio node that is present near this user is stopped, the device owned by this malicious user cannot connect to this radio node. Therefore, with the use of the radio node 30 according to this example embodiment, it is possible to improve the security level of the entire radio communication system 100.

Modified Example

The following modifications may be made to the first example embodiment.

<1> While the radio node 30 includes two communication units, it may include three or more communication units. Even in this case, the determination unit 332 determines whether there is a communication apparatus 40 that transmits data via the communication unit that serves as an access point. When the determination unit 332 determines that a communication apparatus 40 that transmits data via the communication unit serving as an access point is not present, the control unit 333 may stop the communication unit that serves as an access point. In this case as well, effects similar to those obtained in the aforementioned example embodiments can be obtained.

<2> The radio node 30 may include, for example, a sensor that detects temperature or vibration, or a human motion sensor. While the radio node 30 determines whether or not to stop the communication unit 34 based on the communication path information of the communication apparatus 40 in the aforementioned example embodiments, the above sensor information may be used. Specifically, it may be estimated that the communication apparatus 40 is connected when the sensor that detects temperature or vibration has detected that the temperature has been increased or when it has detected that the magnitude of the vibration is large compared to a case in which the communication apparatus 40 is not connected. Further, it may be estimated that the communication apparatus 40 is connected when a human motion sensor has detected a person. Then the radio node 30 may share the sensor information with other radio nodes and determine whether or not to stop the communication unit 34 using the sensor information. According to the above configuration as well, effects similar to those obtained in the aforementioned example embodiments can be obtained.

<3> In the aforementioned example embodiments, the identification information of the communication apparatus 40 is registered from the operation terminal 50. However, the operation terminal 50 may not be used. An external storage medium that holds identification information of the communication apparatus 40 may instead be used, whereby the above identification information may be registered from the input/output unit 37. Alternatively, the identification information of the communication apparatus 40 may be registered from the input/output unit 37 using a barcode in which this identification information is set. According to the above configuration as well, effects similar to those obtained in the aforementioned example embodiments can be obtained.

<4> In the aforementioned example embodiments, the radio node 30 is, for example, a mobile router, a wireless LAN access point, a repeater, a mobile telephone terminal, a smartphone terminal, a tablet terminal, a personal computer apparatus or the like. However, the radio node 30 is not limited thereto. For example, a mobile apparatus such as a drone or a robot may include a configuration that the radio node 30 includes.

While the present disclosure has been described with reference to the example embodiments, the present disclosure is not limited to the aforementioned example embodiments. Various changes that can be understood by those skilled in the art can be made to the configurations and the details of the present disclosure within the scope of the present disclosure.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-Read Only Memory (ROM), CD-R, CD-R/W, and semiconductor memories (such as mask ROM, Programmable ROM (PROM), Erasable PROM (EPROM), flash ROM, Random Access Memory (RAM), etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, a part or all of the aforementioned example embodiments may be described as shown in the following Supplementary Notes. However, they are not limited thereto.

(Supplementary Note 1)
A radio node comprising:
a first communication means for connecting to at least one communication apparatus allowed to be connected to a network and another radio node;
determination means for determining, in a situation in which each of all the communication apparatuses is connected to one of the radio nodes included in the network, whether or not a communication apparatus that transmits data via the first communication means is present; and
control means for stopping the first communication means when it is determined that a communication apparatus that transmits data via the first communication means is not present.

(Supplementary Note 2)
The radio node according to Supplementary Note 1, wherein the control means does not stop the first communication means when it is determined that a communication apparatus that transmits data via the first communication means is present.

(Supplementary Note 3)
The radio node according to Supplementary Note 1 or 2, wherein
the network is a tree network in which one of the radio nodes is used as a root node,
a second communication means for communicating with a first radio node that is connected to the radio node and whose hierarchical level is high and sharing connection information of all the communication apparatuses with other radio nodes in the tree network,
the first communication means communicates with a second radio node that is connected to the radio node and whose hierarchical level is low and shares connection information of all the communication apparatuses with other radio nodes in the tree network, and
the determination means determines, based on connection information of all the communication apparatuses, whether or not a communication apparatus that transmits data via the first communication means is present.

(Supplementary Note 4)
The radio node according to Supplementary Note 3, wherein
when connection with a radio node to which one of the communication apparatuses is connected has been released,
the first communication means communicates with the second radio node and shares connection release information of the communication apparatus whose connection has been released with other radio nodes,
the second communication means communicates with the first radio node and shares the connection release information with other radio nodes, and
the control means activates the first communication means when the first communication means has been stopped.

(Supplementary Note 5)
The radio node according to Supplementary Note 3 or 4, wherein
the connection information is communication path information of the communication apparatus, and
the determination means determines, when communication path information of the communication apparatus does not include the radio node, that the communication apparatus that transmits data via the first communication means is not present.

(Supplementary Note 6)
The radio node according to Supplementary Note 5, wherein the communication path information of the communication apparatus is information on a communication path from the root node to the communication apparatus.

(Supplementary Note 7)

The radio node according to any one of Supplementary Notes 3 to 6, wherein the first communication means receives, from the second radio node, information indicating that the first communication means of the second radio node has been stopped, and when the control means stops the first communication means of the radio node, the control means stops the first communication means after the reception of the information indicating that the first communication means of the second radio node has been stopped.

(Supplementary Note 8)

The radio node according to any one of Supplementary Notes 3 to 7, further comprising:

input means for registering identification information of the communication apparatus from an operation terminal that registers identification information of the communication apparatus, wherein the first communication means communicates with the second radio node and shares the identification information of the communication apparatus that has been registered with other radio nodes, and the second communication means communicates with the first radio node and shares the identification information of the communication apparatus that has been registered with the other radio nodes.

(Supplementary Note 9)

The radio node according to any one of Supplementary Notes 3 to 8, further comprising:

storage means for managing identification information of the communication apparatus and connection information of the communication apparatus in association with each other; and data management means for updating, when connection information or connection release information of one of the communication apparatuses has been shared, connection information of this communication apparatus managed by the storage means, wherein the determination means determines, based on connection information of all the communication apparatuses stored in the storage means, whether or not the communication apparatus that transmits data via the first communication means is present.

(Supplementary Note 10)

The radio node according to Supplementary Note 8 or 9, further comprising output means for outputting information including at least one of the identification information of the communication apparatus and the connection information of the communication apparatus.

(Supplementary Note 11)

The radio node according to any one of Supplementary Notes 1 to 10, wherein the control means controls whether or not to stop the first communication means by controlling power supply to the first communication means.

(Supplementary Note 12)

A radio communication system comprising:

at least one communication apparatus allowed to be connected to a network and at least one radio node, wherein each of the radio nodes comprises:

a first communication means for connecting to the communication apparatus and another radio node;

determination means for determining, in a situation in which each of all the communication apparatuses is connected to one of the radio nodes included in the network, whether or not a communication apparatus that transmits data via the first communication means is present; and control means for stopping the first communication means when it is determined that a communication apparatus that transmits data via the first communication means is not present.

(Supplementary Note 13)

The radio communication system according to Supplementary Note 12, wherein the control means does not stop the first communication means when it is determined that a communication apparatus that transmits data via the first communication means is present.

(Supplementary Note 14)

The radio communication system according to Supplementary Note 12 or 13, wherein the network is a tree network in which one of the radio nodes is used as a root node, each of the radio nodes further comprises a second communication means for communicating with a first radio node whose hierarchical level is high and sharing connection information of all the communication apparatuses with other radio nodes in the tree network, the first communication means communicates with a second radio node that is connected to the radio node and whose hierarchical level is low and shares connection information of all the communication apparatuses with other radio nodes in the tree network, and the determination means determines, based on connection information of all the communication apparatuses, whether or not a communication apparatus that transmits data via the first communication means is present.

(Supplementary Note 15)

The radio communication system according to Supplementary Note 14, wherein when connection with a radio node to which one of the communication apparatuses is connected has been released, the first communication means communicates with the second radio node and shares connection release information of the communication apparatus whose connection has been released with other radio nodes, the second communication means communicates with the first radio node and shares the connection release information with other radio nodes, and the control means activates the first communication means when the first communication means has been stopped.

(Supplementary Note 16)

The radio communication system according to Supplementary Note 14 or 15, wherein the connection information is communication path information of the communication apparatus, and the determination means determines, when communication path information of the communication apparatus does not include the radio node, that the communication apparatus that transmits data via the first communication means is not present.

(Supplementary Note 17)

The radio communication system according to Supplementary Note 16, wherein the communication path information of the communication apparatus is information on a communication path from the root node to the communication apparatus.

(Supplementary Note 18)
The radio communication system according to any one of Supplementary Notes 14 to 17, wherein
the first communication means receives, from the second radio node, information indicating that the first communication means of the second radio node has been stopped, and
when the control means stops the first communication means of the radio node, the control means stops the first communication means after the reception of the information indicating that the first communication means of the second radio node has been stopped.
(Supplementary Note 19)
The radio communication system according to any one of Supplementary Notes 14 to 18, wherein
each of the radio nodes further comprises input means for registering identification information of the communication apparatus from an operation terminal that registers identification information of the communication apparatus,
the first communication means communicates with the second radio node and shares the identification information of the communication apparatus that has been registered with other radio nodes, and
the second communication means communicates with the first radio node and shares the identification information of the communication apparatus that has been registered with the other radio nodes.
(Supplementary Note 20)
The radio communication system according to any one of Supplementary Notes 14 to 19, wherein
each of the radio nodes further comprises:
storage means for managing identification information of the communication apparatus and connection information of the communication apparatus in association with each other; and
data management means for updating, when connection information or connection release information of one of the communication apparatuses has been shared, connection information of this communication apparatus managed by the storage means, and
the determination means determines, based on connection information of all the communication apparatuses stored in the storage means, whether or not the communication apparatus that transmits data via the first communication means is present.
(Supplementary Note 21)
The radio communication system according to Supplementary Note 19 or 20, wherein each of the radio nodes further comprises output means for outputting information including at least one of the identification information of the communication apparatus and the connection information of the communication apparatus.
(Supplementary Note 22)
The radio communication system according to any one of Supplementary Notes 12 to 21, wherein the control means controls whether or not to stop the first communication means by controlling power supply to the first communication means.
(Supplementary Note 23)
A communication control method in a radio node, the communication control method comprising:
determining, in a situation in which each of all communication apparatuses that are allowed to be connected to a network is connected to one of radio nodes included in the network, whether or not a communication apparatus that transmits data via a first communication means that is connected to one of the communication apparatuses and another radio node is present; and
stopping the first communication means when it is determined that a communication apparatus that transmits data via the first communication means is not present.
(Supplementary Note 24)
The communication control method according to Supplementary Note 23, comprising not stopping the first communication means when it is determined that a communication apparatus that transmits data via the first communication means is present.
(Supplementary Note 25)
The communication control method according to Supplementary Note 23 or 24, wherein
the network is a tree network in which one of the radio nodes is used as a root node,
in the tree network,
the first communication means communicates with a second radio node that is connected to the radio node and whose hierarchical level is low and shares connection information of all the communication apparatuses with other radio nodes,
a second communication means communicates with a first radio node that is connected to the radio node and whose hierarchical level is high and shares connection information of all the communication apparatuses with other radio nodes, and
it is determined, based on connection information of all the communication apparatuses, whether or not a communication apparatus that transmits data via the first communication means is present.
(Supplementary Note 26)
The communication control method according to Supplementary Note 25, wherein
when connection with a radio node to which one of the communication apparatuses is connected has been released,
the first communication means communicates with the second radio node and shares connection release information of the communication apparatus whose connection has been released with other radio nodes,
the second communication means communicates with the first radio node and shares the connection release information with other radio nodes, and
the first communication means is activated when the first communication means has been stopped.
(Supplementary Note 27)
The communication control method according to Supplementary Note 25 or 26, wherein
the connection information is communication path information of the communication apparatus, and
it is determined, when communication path information of the communication apparatus does not include the radio node, that the communication apparatus that transmits data via the first communication means is not present.
(Supplementary Note 28)
The communication control method according to Supplementary Note 27, wherein the communication path information of the communication apparatus is information on a communication path from the root node to the communication apparatus.
(Supplementary Note 29)
The communication control method according to any one of Supplementary Notes 25 to 28, wherein
the first communication means receives, from the second radio node, information indicating that the first communication means of the second radio node has been stopped, and
when the first communication means of the radio node is stopped, the first communication means is stopped after the reception of the information indicating that the first communication means of the second radio node has been stopped.

(Supplementary Note 30)

The communication control method according to any one of Supplementary Notes 25 to 29, comprising:

registering identification information of the communication apparatus from an operation terminal that registers identification information of the communication apparatus, wherein the first communication means communicates with the second radio node and shares the identification information of the communication apparatus that has been registered with other radio nodes, and the second communication means communicates with the first radio node and shares the identification information of the communication apparatus that has been registered with the other radio nodes.

(Supplementary Note 31)

The communication control method according to any one of Supplementary Notes 25 to 30, comprising:

storing identification information of the communication apparatus and connection information of the communication apparatus in association with each other;

updating, when connection information or connection release information of one of the communication apparatuses has been shared, connection information of the communication apparatus that has been stored; and determining, based on the stored connection information of all the communication apparatuses, whether or not the communication apparatus that transmits data via the first communication means is present.

(Supplementary Note 32)

The communication control method according to Supplementary Note 30 or 31, comprising outputting information including at least one of the identification information of the communication apparatus and the connection information of the communication apparatus.

(Supplementary Note 33)

The communication control method according to any one of Supplementary Notes 23 to 32, comprising controlling whether or not to stop the first communication means by controlling power supply to the first communication means.

(Supplementary Note 34)

A non-transitory computer readable medium storing a program for causing a radio node to execute the following processing of:

determining, in a situation in which each of all communication apparatuses that are allowed to be connected to a network is connected to one of radio nodes included in the network, whether or not a communication apparatus that transmits data via a first communication means that is connected to one of the communication apparatuses and another radio node is present; and stopping the first communication means when it is determined that a communication apparatus that transmits data via the first communication means is not present.

(Supplementary Note 35)

The non-transitory computer readable medium according to Supplementary Note 34, wherein the program further comprises not stopping the first communication means when it is determined that a communication apparatus that transmits data via the first communication means is present.

(Supplementary Note 36)

The non-transitory computer readable medium according to Supplementary Note 34 or 35, wherein the network is a tree network in which one of the radio nodes is used as a root node, the program further comprises:

in the tree network, communicating, by the first communication means, with a second radio node that is connected to the radio node and whose hierarchical level is low and sharing connection information of all the communication apparatuses with other radio nodes; and communicating, by a second communication means connected to one of the communication apparatuses and another radio node, with a first radio node that is connected to the radio node and whose hierarchical level is high and sharing connection information of all the communication apparatuses with other radio nodes, and it is determined, based on connection information of all the communication apparatuses, whether or not a communication apparatus that transmits data via the first communication means is present.

(Supplementary Note 37)

The non-transitory computer readable medium according to Supplementary Note 36, wherein the program further comprises:

when connection with a radio node to which one of the communication apparatuses is connected has been released, communicating, by the first communication means, with the second radio node and sharing connection release information of the communication apparatus whose connection has been released with other radio nodes;

communicating, by the second communication means, with the first radio node and sharing the connection release information with other radio nodes; and activating the first communication means when the first communication means has been stopped.

(Supplementary Note 38)

The non-transitory computer readable medium according to Supplementary Note 36 or 37, wherein the connection information is communication path information of the communication apparatus, and the program determines, when communication path information of the communication apparatus does not include the radio node, that the communication apparatus that transmits data via the first communication means is not present.

(Supplementary Note 39)

The non-transitory computer readable medium according to Supplementary Note 38, wherein the communication path information of the communication apparatus is information on a communication path from the root node to the communication apparatus.

(Supplementary Note 40)

The non-transitory computer readable medium according to any one of Supplementary Notes 36 to 39, wherein the program further comprises:

receiving, by the first communication means, information indicating that the first communication means of the second radio node has been stopped from the second radio node; and stopping, when the first communication means of the radio node is stopped, the first communication means after receiving the information indicating that the first communication means of the second radio node has been stopped.

(Supplementary Note 41)

The non-transitory computer readable medium according to any one of Supplementary Notes 36 to 40, wherein the program further comprises:

registering identification information of the communication apparatus from an operation terminal that registers identification information of the communication apparatus;

communicating, by the first communication means, with the second radio node and sharing the identification information of the communication apparatus that has been registered with other radio nodes; and communicating, by the second communication means, with the first radio node and sharing the identification information of the communication apparatus that has been registered with the other radio nodes.

(Supplementary Note 42)

The non-transitory computer readable medium according to any one of Supplementary Notes 36 to 41, wherein the program further comprises:

storing identification information of the communication apparatus and connection information of the communication apparatus in association with each other;

updating, when connection information or connection release information of one of the communication apparatuses has been shared, connection information of the communication apparatus that has been stored; and determining, based on the stored connection information of all the communication apparatuses, whether or not the communication apparatus that transmits data via the first communication means is present.

(Supplementary Note 43)

The non-transitory computer readable medium according to Supplementary Note 41 or 42, wherein the program further comprises outputting information including at least one of the identification information of the communication apparatus and the connection information of the communication apparatus.

(Supplementary Note 44)

The non-transitory computer readable medium according to any one of Supplementary Notes 34 to 43, wherein the program controls whether or not to stop the first communication means by controlling power supply to the first communication means.

REFERENCE SIGNS LIST

100 Radio Communication System
10, 21, 30, 30_1-30_5 Radio Node
20, 40 Communication Apparatus
11, 34, 35 Communication Unit
12, 332 Determination Unit
13, 333 Control Unit
31 FROM
32 RAM
33 CPU
36 Power Supply Unit
37 Input/output Unit
50 Operation Terminal
331 Data Management Unit
341, 351 Radio Module
342, 352 Antenna

The invention claimed is:

1. A radio node comprising:

hardware, including a processor and a memory;

a first communication unit that is implemented at least by the hardware and that connects to at least one communication apparatus allowed to be connected to a tree network in which one of radio nodes is used as a root node, communicates with a first radio node, and shares connection information of the at least one communication apparatus with other radio nodes in the tree network, wherein the first radio node is connected to the radio node and whose hierarchical level is lower than that of the radio node in the tree network;

a second communication unit that is implemented at least by the hardware and that communicates with a second radio node, and shares the connection information of the at least one communication apparatus with the other radio nodes, wherein the second radio node is connected to the radio node and whose hierarchical level is higher than that of the radio node in the tree network;

a determination unit that is implemented at least by the hardware and that determines, based on whether or not connection information of the at least one communication apparatus has been registered, whether or not each of the at least one communication apparatus is connected to one of the radio nodes included in the tree network, and determines, when the determination unit determines that each of the at least one communication apparatus is connected to one of the radio nodes included in the tree network, whether or not a communication apparatus that transmits data via the first communication unit is present based on the connection information of the at least one communication apparatus; and a control unit that is implemented at least by the hardware and that stops the first communication unit when the determination unit determines that a communication apparatus that transmits data via the first communication unit is not present.

2. The radio node according to claim 1, wherein the control unit does not stop the first communication unit when the determination unit determines that a communication apparatus that transmits data via the first communication unit is present.

3. The radio node according to claim 1, wherein when one of the at least one communication apparatus releases connection with a radio node to which the at least one communication apparatus is connected, the first communication unit communicates with the first radio node and shares connection release information of the at least one communication apparatus whose connection has been released with other radio nodes, the second communication unit communicates with the second radio node and shares the connection release information with other radio nodes, and the control unit activates the first communication unit when the first communication unit has been stopped.

4. The radio node according to claim 1, wherein the connection information is communication path information of the at least one communication apparatus, and the determination unit determines, when communication path information of the at least one communication apparatus do not include the radio node, that a communication apparatus that transmits data via the first communication unit is not present.

5. The radio node according to claim 4, wherein the communication path information of the at least one communication apparatus is information on a communication path from the root node to the at least one communication apparatus.

6. The radio node according to claim 1, wherein the first communication unit receives, from the first radio node, information indicating that the first communication unit of the first radio node has been stopped, and when the control unit stops the first communication unit of the radio node, the control unit stops the first communication unit after the reception of the information indicating that the first communication unit of the first radio node has been stopped.

7. The radio node according to claim 1, further comprising:
   input unit that is implemented at least by the hardware and that registers identification information of the communication apparatus from an operation terminal that registers identification information of the at least one communication apparatus, wherein
   the first communication unit communicates with the first radio node and shares the identification information of the at least one communication apparatus that has been registered with other radio nodes, and
   the second communication unit communicates with the second radio node and shares the identification information of the at least one communication apparatus that has been registered with the other radio nodes.

8. A communication control method in a radio node, the communication control method comprising:
   sharing connection information of at least one communication apparatus allowed to be connected to a tree network in which one of radio nodes is used as a root node with other radio nodes in the tree network via a first communication unit that communicates with the at least one communication apparatus and a first radio node, wherein the first radio node is connected to the radio node and whose hierarchical level is lower than that of the radio node in the tree network;
   sharing the connection information of the at least one communication apparatus with the other radio nodes in the tree network via a second communication unit that communicates with a second radio node, wherein the second radio node is connected to the radio node and whose hierarchical level is higher than that of the radio node;
   determining, based on whether or not connection information of the at least one communication apparatus has been registered, whether or not each of the at least one communication apparatus is connected to one of radio nodes included in the tree network;
   determining, when it is determined that each of the at least one communication apparatus is connected to one of the radio nodes included in the tree network, whether or not a communication apparatus that transmits data via the first communication unit is present based on the connection information of the at least one communication apparatus; and
   stopping the first communication unit when it is determined that a communication apparatus that transmits data via the first communication unit is not present.

9. A non-transitory computer readable medium storing a program for causing a radio node to execute the following processing of:
   sharing connection information of at least one communication apparatus allowed to be connected to a tree network in which one of radio nodes is used as a root node with other radio nodes in the tree network via a first communication unit that communicates with the at least one communication apparatus and a first radio node, wherein the first radio node is connected to the radio node and whose hierarchical level is lower than that of the radio node in the tree network;
   sharing the connection information of the at least one communication apparatus with the other radio nodes in the tree network via a second communication unit that communicates with a second radio node, wherein the second radio node is connected to the radio node and whose hierarchical level is higher than that of the radio node;
   determining, based on whether or not connection information of the at least one communication apparatus has been registered, whether or not each of the at least one communication apparatus is connected to one of radio nodes included in the tree network;
   determining, when it is determined that each of the at least one communication apparatus is connected to one of the radio nodes included in the tree network, whether or not a communication apparatus that transmits data via the first communication unit is present based on the connection information of the at least one communication apparatus; and
   stopping the first communication unit when it is determined that a communication apparatus that transmits data via the first communication unit is not present.

* * * * *